United States Patent
Tohyama

(10) Patent No.: US 8,417,110 B2
(45) Date of Patent: Apr. 9, 2013

(54) IMAGE PICKUP APPARATUS CAPABLE OF DISPLAYING A IMAGE REPRESENTING AN OBJECT BRIGHTNESS THAT CAN BE SET AS A TARGET EXPOSURE BY EXPOSURE CONTROL, AND METHOD OF CONTROLLING THE SAME

(75) Inventor: Kei Tohyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/869,337

(22) Filed: Aug. 26, 2010

(65) Prior Publication Data

US 2011/0064399 A1    Mar. 17, 2011

(30) Foreign Application Priority Data

Sep. 11, 2009    (JP) .................................. 2009-210492

(51) Int. Cl.
G03B 17/18    (2006.01)
(52) U.S. Cl. .................................... 396/287; 348/333.02
(58) Field of Classification Search .................. 396/243, 396/245, 287; 348/333.02
See application file for complete search history.

(56) References Cited

U.S. PATENT DOCUMENTS

| 4,618,238 | A | * | 10/1986 | Maitani et al. | 396/223 |
| 4,748,468 | A | * | 5/1988 | Fujino et al. | 396/121 |
| 2005/0275728 | A1 | * | 12/2005 | Mirtich et al. | 348/211.99 |
| 2006/0055785 | A1 | * | 3/2006 | Nagajima | 348/207.99 |
| 2006/0250515 | A1 | * | 11/2006 | Koseki et al. | 348/362 |
| 2007/0263112 | A1 | * | 11/2007 | Shinkai | 348/333.01 |
| 2008/0192140 | A1 | * | 8/2008 | Lee et al. | 348/362 |
| 2009/0003819 | A1 | * | 1/2009 | Nishiwaki | 396/222 |

FOREIGN PATENT DOCUMENTS

| JP | 61179432 A | * | 8/1986 |
| JP | 2003280078 A | * | 10/2003 |
| JP | 2005-115060 | | 4/2005 |

* cited by examiner

*Primary Examiner* — W. B. Perkey
*Assistant Examiner* — Fang-Chi Chang
(74) *Attorney, Agent, or Firm* — Cowan, Liebowitz & Latman, P.C.

(57) ABSTRACT

An image pickup apparatus which is capable of shooting a still image and a moving image and displaying an exposure parameter interlocking range. A light metering unit meters an object brightness. A camera microcomputer performs exposure control such that an exposure becomes equal to a target exposure determined based on a result of metering by the light metering unit. The camera microcomputer causes the image display section to display a first image representing the object brightness metered by the light metering unit and a second image representing an object brightness that can be set as the target exposure by the exposure control.

5 Claims, 20 Drawing Sheets

FIG.18

| (Tv,Av,Sv) | SHUTTER SPEED | APERTURE VALUE | ISO SENSITIVITY |
|---|---|---|---|
| 0 | 1 | 1.0 | 3 |
| 1 | 1/2 | 1.4 | 6 |
| 2 | 1/4 | 2.0 | 12 |
| 3 | 1/8 | 2.8 | 25 |
| 4 | 1/15 | 4.0 | 50 |
| 5 | 1/30 | 5.6 | 100 |
| 6 | 1/60 | 8.0 | 200 |
| 7 | 1/125 | 11 | 400 |
| 8 | 1/250 | 16 | 800 |
| 9 | 1/500 | 22 | 1600 |
| 10 | 1/1000 | 32 | 3200 |
| 11 | 1/2000 | 45 | 6400 |
| 12 | 1/4000 | 64 | 12800 |

Bv = 11.5
OR HIGHER

Bv=11

Bv=10

Bv=8.5

Bv=7

Bv=6.5

Bv=5

Bv=4

Bv=3

Bv = 2.5
OR LOWER

IMAGE PICKUP APPARATUS CAPABLE OF DISPLAYING A IMAGE REPRESENTING AN OBJECT BRIGHTNESS THAT CAN BE SET AS A TARGET EXPOSURE BY EXPOSURE CONTROL, AND METHOD OF CONTROLLING THE SAME

BACKGROUND OF THE INVENTION

1. Field of the Invention

The present invention relates to an image pickup apparatus which is capable of picking up a still image and a moving image and displaying a image representing an object brightness that can be set as a target exposure by exposure control, and a method of controlling the same.

2. Description of the Related Art

Conventionally, an image pickup apparatus (camera) is configured such that a user can set an aperture value (Av value) and a shutter speed (time value: Tv value). For example, when the user selects an exposure mode in which the user sets an Av value and the camera performs shooting after changing the shutter speed and the ISO sensitivity (photographic sensitivity) (this exposure mode will be hereinafter referred to as "the Av priority mode"), a conventional camera performs control as follows: When ambient brightness changes and any of the shutter speed and the ISO sensitivity reaches its limit value, a shutter speed display section provided on a camera main unit is caused to flash on and off so as to warn the user that the Av value is out of an interlocking range, or the Av value is automatically changed to a value other than a set value, so as to obtain correct exposure.

Further, for example, when the user selects another exposure mode in which the user sets a shutter speed and the camera performs shooting after changing an Av value and an ISO sensitivity (this exposure mode will be hereinafter referred to as "the Tv priority mode"), the exposure control is performed by replacing the Av value in the Av priority mode with the shutter speed. It should be noted that the term "interlocking range" is intended to mean respective ranges of Av values, Tv values and ISO sensitivities within each of which the camera can automatically set an associated one of an Av value, a Tv value and an ISO sensitivity in a fashion interlocked with the others such that correct exposure is obtained.

On the other hand, as a technique related to the above-described camera control, there has been proposed the following technique (e.g. Japanese Patent Laid-Open Publication No. 2005-115060). According to Japanese Patent Laid-Open Publication No. 2005-115060, in a combination of a camera which is capable of automatically setting an ISO sensitivity and a flash unit (strobe), the upper and lower limit values of ISO sensitivity and an Av value, which can be set, are sent from the camera to the flash unit, and the flash unit displays a interlocking range for lighting control defined by also taking into account a range of ISO sensitivities.

In the conventional technique described above, a warning is displayed when any of parameters changed by the camera, except the Av value or the shutter speed set by the user, falls out of its interlocking range. However, there remains a problem of actual exposure causing overexposure (which makes an entire image whitish) or underexposure (which makes an entire image blackish).

Further, in the conventional technique, when any of the parameters changed by the camera, except the settings configured by the user, falls out of its interlocking range, the camera automatically performs control for changing the settings, so that correct exposure can be obtained. However, it is impossible to obtain an image creating effect, such as a blur effect (adjustment of the degree of blur of a background) as intended by an Av value initially set by the user and a stop effect (moving object taken as an image in a still state or in a blurred state) as intended by a shutter speed initially set by the user.

SUMMARY OF THE INVENTION

The present invention makes it possible to show a user a guide for determination as to whether shooting can be performed with correct exposure or whether shooting can be performed with correct exposure without changing a set shutter speed or a set aperture value, when ambient brightness changes before the shooting.

In a first aspect of the present invention, there is provided an image pickup apparatus comprising a display unit, a light metering unit configured to meter an object brightness, an exposure control unit configured to perform exposure control such that an exposure becomes equal to a target exposure determined based on a result of metering by the light metering unit, and a display control unit configured to cause the display unit to display a first image representing the object brightness metered by the light metering unit and a second image representing an object brightness that can be set as the target exposure by the exposure control.

In a second aspect of the present invention, there is provided a method of controlling an image pickup apparatus including a display unit, a light metering unit configured to meter an object brightness, and an exposure control unit configured to perform exposure control such that an exposure becomes equal to a target exposure determined based on a result of metering by the light metering unit, comprising causing the display unit to display a first image representing the object brightness metered by the light metering unit and a second image representing an object brightness that can be set as the target exposure by the exposure control.

According to the present invention, a first image representing an object brightness metered by the light metering unit and a second image representing an object brightness that can be set as a target exposure by exposure control are displayed, which makes it possible to show the user a guide for determination as to whether shooting can be performed with correct exposure or whether shooting can be performed with correct exposure without changing a set shutter speed or a set aperture value, when ambient brightness changes before the shooting.

Further features of the present invention will become apparent from the following description of exemplary embodiments with reference to the attached drawings.

BRIEF DESCRIPTION OF THE DRAWINGS

FIG. 18 is a diagram showing a relationship between the shutter speed, the aperture value, and the ISO sensitivity of the digital camera.

DETAILED DESCRIPTION OF THE EMBODIMENTS

The present invention will now be described in detail below with reference to the accompanying drawings showing embodiments thereof.

Figure 1:
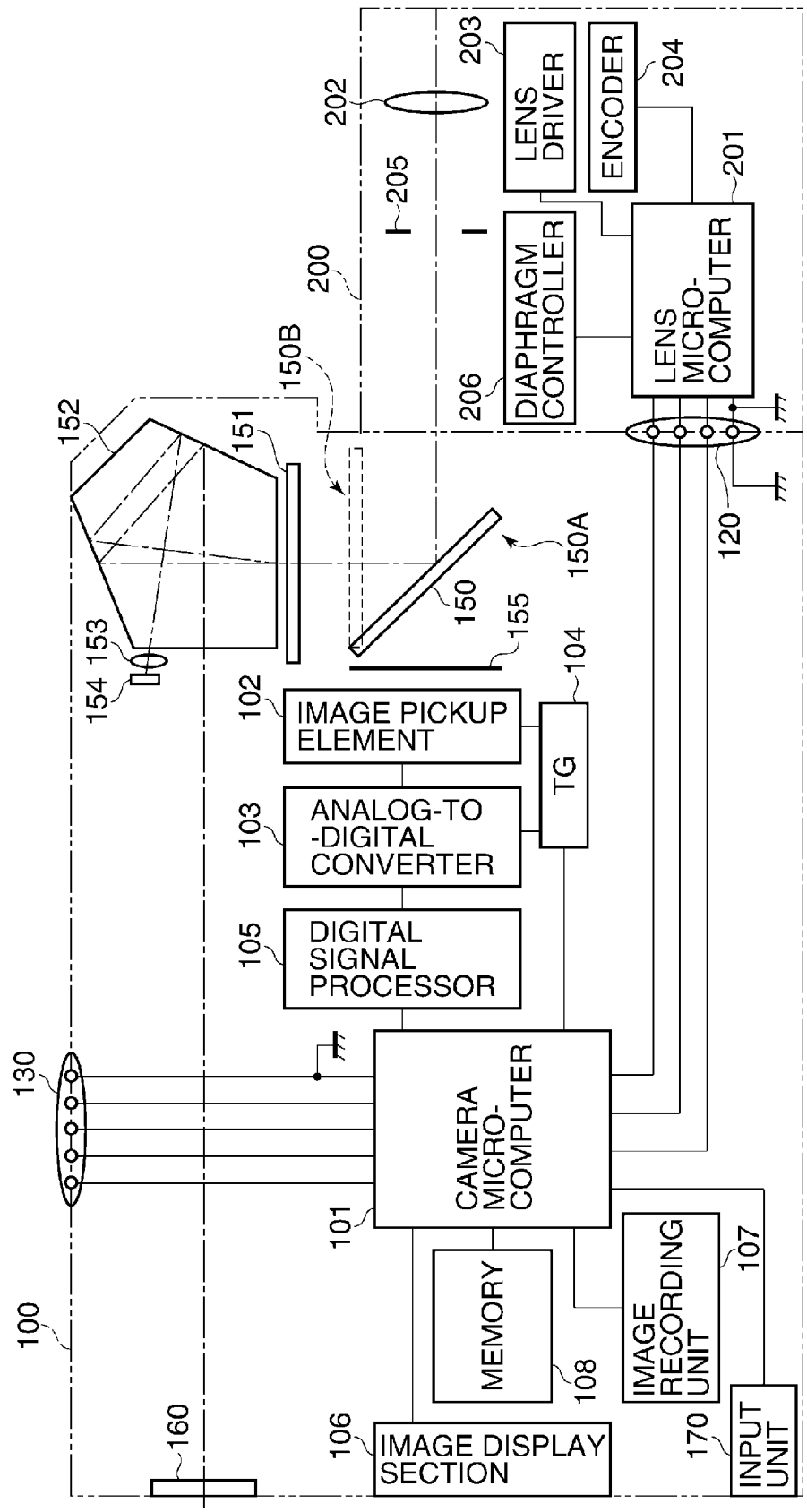
FIG. 1 is a block diagram of a digital camera as an image pickup apparatus according to a first embodiment of the present invention.

FIG. 1 is a block diagram of a digital camera as an image pickup apparatus according to a first embodiment of the present invention.

Referring to FIG. 1, the digital camera comprises a digital camera main unit 100, a lens unit 200 removably mounted on the digital camera main unit 100, and a flash unit (strobe: not shown) removably mounted on the digital camera main unit 100. The digital camera is capable of performing both still image shooting and moving image shooting.

The digital camera main unit 100 includes a microcomputer (hereinafter referred to as the camera microcomputer) 101, an image pickup element 102, an analog-to-digital converter 103, a timing generator (hereinafter acronymized as TG) 104, a digital signal processor 105, an image display section 106, and an image recording unit 107. The lens unit 200 comprises a microcomputer (hereinafter referred to as the lens microcomputer) 201, a photographic lens 202, a lens driver 203, an encoder 204, a diaphragm 205, and a diaphragm controller 206.

First, a description will be given of the arrangement of the digital camera main unit 100. The camera microcomputer 101 performs overall control of the digital camera main unit 100 and various kinds of computations, and executes a process shown in a flowchart in FIGS. 2A and 2B, based on a control program. The image pickup element 102 is implemented e.g. by a sensitivity-adjustable CCD image sensor (or CMOS image sensor) including an infrared cut filter and a low-pass filter, and photoelectrically converts an optical image of an object formed through the photographic lens 202 to an electric signal.

The analog-to-digital converter 103 converts an analog electric signal output from the image pickup element 102 to digital image data. The TG 104 generates driving timing for operating each of the image pickup element 102 and the analog-to-digital converter 103 and controls charge accumulation time (shutter speed) of the image pickup element 102 in a moving image shooting mode. Further, the TG 104 is capable of changing the shutter speed (time value: Tv) and the sensitivity (ISO sensitivity) of the image pickup element 102.

The digital signal processor 105 performs image processing on image data subjected to analog-to-digital conversion by the analog-to-digital converter 103, according to image processing parameters. The image display section 106 is implemented e.g. by a liquid crystal panel, and displays an image picked up by the image pickup element 102, settings configured by the user, and so forth. The image recording unit 107 records an image picked up by the digital camera. A memory 108 stores various kinds of data.

Further, the digital camera main unit 100 has a photographic optical system including a main mirror 150, a focus board 151, a pentaprism 152, an imaging lens 153, a light metering section 154, a shutter 155, a viewfinder 160, a power switch (not shown), and a moving image shooting start switch (not shown). FIG. 1 schematically shows the arrangement of the photographic optical system in the transverse direction of the digital camera main unit 100.

The power switch is operated to switch on or off the power of the digital camera. The moving image shooting start switch is operated to start moving image shooting by the digital camera. The main mirror 150 is controlled by the camera microcomputer 101 such that it is positioned in either a viewing position 150A (disposed obliquely across the photographic optical path) for the user to view an object through the viewfinder 160 or a shooting position 150B (retracted from the photographic optical path) for shooting the object. The main mirror 150 is driven by a motor (not shown) based on the control signal from the camera microcomputer 101.

The focus board 151 is disposed on an expected image-forming plane of the photographic lens 202. The pentaprism 152 changes the photographic optical path passing through the viewfinder 160. The user uses the viewfinder 160 to view an imaging screen by viewing the focus board 151. The imaging lens 153 and the light metering section 154 are used to meter an object brightness within the imaging screen (viewing screen). The imaging lens 153 causes the focus board 151 and the light metering section 154 to be cooperatively associated with each other via a reflection optical path within the pentaprism 152. The output of the light metering section 154 is connected to an AD terminal (not shown) of the camera microcomputer 101, whereby a photometric value is read.

The shutter 155 is provided with front and rear curtains capable of traveling. The shutter 155 blocks light to the image pickup element 102 and performs an exposure operation by the front curtain and the rear curtain which travel at a predetermined time interval. The operation of the shutter 155 is controlled by the camera microcomputer 101 via a control terminal (not shown). Although in the present embodiment, the shutter 155 is disposed between the image pickup element 102 and the main mirror 150, this is not limitative, but an electronic shutter may be employed instead of disposing the shutter 155 between the image pickup element 102 and the main mirror 150.

An interface unit 130 provides interface with the flash unit, and enables communication between the camera microcomputer 101 and a flash unit microcomputer (not shown).

An interface unit 120 provides interface with the lens unit 200, and enables communication between the camera microcomputer 101 and the lens microcomputer 201.

Next, a description will be given of the lens unit 200. The lens microcomputer 201 controls the overall operation of the lens unit 200. The photographic lens 202 comprises a plurality of lenses (not shown). The lens unit 200 may be configured to have a single focus based on a focal length of the photographic lens 202, or alternatively may be configured to have a changeable focal length. The lens driver 203 moves a focusing optical system provided in the photographic lens 202. A driving amount for driving the photographic lens 202 is calculated by the camera microcomputer 101 based on an output from a known automatic focus detector (not shown) provided in the digital camera main unit 100.

The driving amount for driving the photographic lens 202 is sent from the camera microcomputer 101 to the lens microcomputer 201. The lens microcomputer 201 causes the lens driver 203 to operate by an amount corresponding to the received driving amount to drive the photographic lens 202. The encoder 204 detects the focal position of the photographic lens 202. The diaphragm 205 is a mechanism for adjusting the amount of light entering the lens. The diaphragm controller 206 controls a stopping-down operation of the diaphragm 205 based on the Av value sent from the camera microcomputer 101 to the lens microcomputer 201.

A light metering unit in the present invention may be configured to calculate a correct exposure value, not based on the result of an image pickup operation by the image pickup element 102 and a shutter speed (time value: Tv), an Av value, and an ISO sensitivity used in the image pickup operation, but based on an output from the light metering section 154.

Next, the operation of the digital camera of the present embodiment, which is constructed as above, will be described with reference to FIGS. 2A, 2B, and 3 to 18.

Figure 2A:
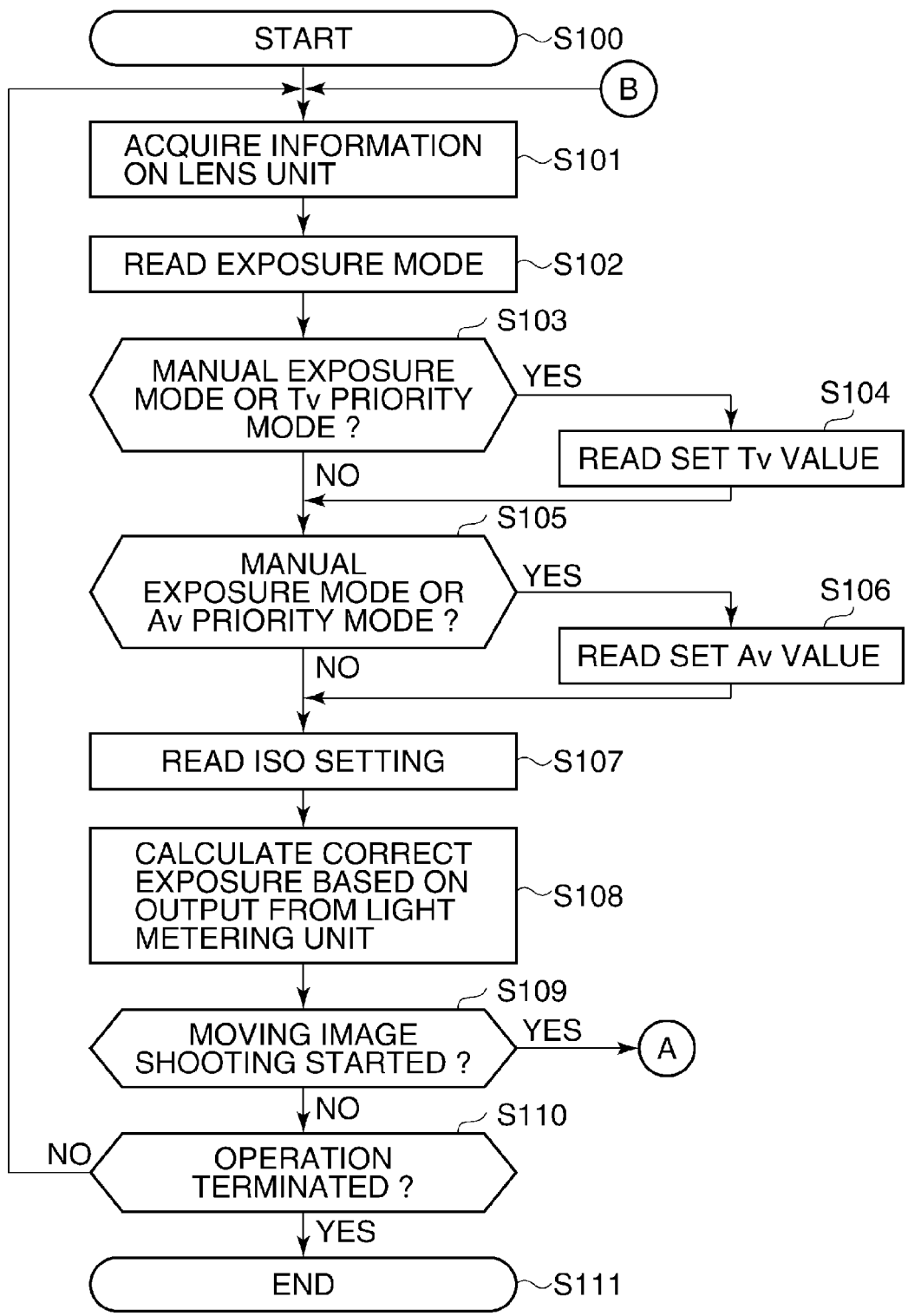
FIG. 2A is a flowchart of a process executed by a microcomputer incorporated in a digital camera main unit of the digital camera.
Figure 2B:
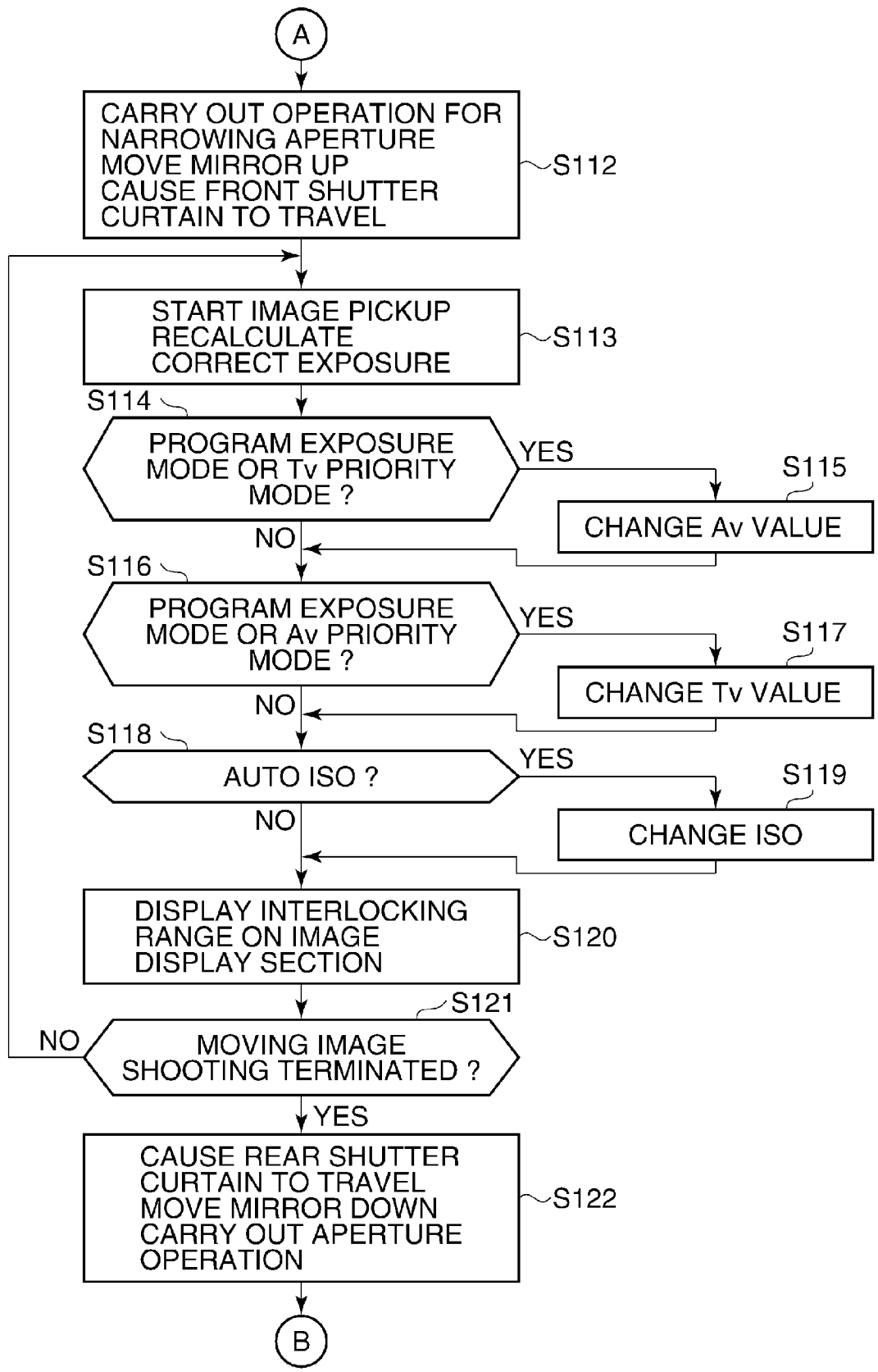
FIG. 2B is a continuation of FIG. 2A.

FIGS. 2A and 2B are a flowchart of a process executed by the camera microcomputer 101 in the digital camera main unit 100 of the digital camera.

In FIGS. 2A and 2B, the camera microcomputer 101 starts the process (step S100) and communicates with the lens unit 200 via the interface unit 120 to acquire information on the lens unit 200 from the lens microcomputer 201 (step S101). The information concerns a wide open aperture value (an open Av value or a minimum Av value) and a maximum aperture value (smallest aperture position or a maximum Av value), i.e. an interlocking range of Av values. Then, the camera microcomputer 101 reads settings for an exposure mode, which are input by the user via an input unit 170 (step S102).

The user can select a desired exposure mode out of a manual exposure mode, an Av priority mode (aperture priority exposure mode), a Tv priority mode (shutter speed priority exposure mode), and a program exposure mode, and set the selected exposure mode by input via the input unit 170.

In the manual exposure mode, the user manually sets a shutter speed (Tv value) and an Av value, and the camera microcomputer 101 controls the ISO sensitivity according to a result of calculation of correct exposure. The camera microcomputer 101 displays the result of calculation of correct exposure and a controllable interlocking range of ISO sensitivities on the image display section 106.

In the Tv priority mode, the user manually sets a Tv value, and the camera microcomputer 101 controls an Av value, or an Av value and an ISO sensitivity according to a result of calculation of correct exposure. The camera microcomputer 101 displays the result of calculation of correct exposure and a controllable interlocking range of Av values or a controllable interlocking range of Av values and ISO sensitivities on the image display section 106.

In the Av priority mode, the user manually sets an Av value, and the camera microcomputer 101 controls a Tv value, or a Tv value and an ISO sensitivity according to a result of calculation of correct exposure. The camera microcomputer 101 displays the result of calculation of correct exposure and a controllable interlocking range of Tv values or a controllable interlocking range of Tv values and ISO sensitivities on the image display section 106.

In the program exposure mode, the camera microcomputer 101 controls a Tv value and an Av value, or a Tv value, an Av value, and an ISO sensitivity according to a result of calculation of correct exposure. The camera microcomputer 101 displays the result of calculation of correct exposure and a controllable interlocking range of Tv values and Av values, or Tv values, Av values, and ISO sensitivities on the image display section 106.

Then, the camera microcomputer 101 determines whether or not the exposure mode read in the step S102 is either the manual exposure mode or the Tv priority mode (step S103). If the read exposure mode is not either the manual exposure mode or the Tv priority mode, the camera microcomputer 101 proceeds to a step S105. If the read exposure mode is the manual exposure mode or the Tv priority mode, the camera microcomputer 101 reads the setting of the Tv value input by the user via the input unit 170 (step S104), and then proceeds to the step S105.

Then, the camera microcomputer 101 determines whether or not the exposure mode read in the step S102 is either the manual exposure mode or the Av priority mode (step S105). If the read exposure mode is not either the manual exposure mode or the Av priority mode, the camera microcomputer 101 proceeds to a step S107. If the read exposure mode is the manual exposure mode or the Av priority mode, the camera microcomputer 101 reads the setting of the Av value input by the user via the input unit 170 (step S106), and then proceeds to the step S107.

Then, the camera microcomputer 101 reads the setting of the sensitivity of the image pickup element 102 (i.e. the ISO sensitivity) input by the user via the input unit 170 (step S107). In the present embodiment, it is assumed that the range of ISO sensitivity which can be set is ISO 100 to ISO 1600. Further, a setting of an auto ISO sensitivity mode in which the ISO sensitivity is changed by the camera microcomputer 101 according to ambient light is read in the step S107. Further, in the auto ISO sensitivity mode, a setting of the ISO sensitivity to be preferentially used is also read in the step S107.

When an object light enters the lens unit 200 through the photographic lens 202 before exposure for shooting by the digital camera, the main mirror 150 of the digital camera main unit 100, which is positioned in the viewing position 150A, enables the light metering section 154 to meter the object light. The camera microcomputer 101 performs computation as follows (step S108): The camera microcomputer 101 calculates a brightness value (Bv: photometric value) based on an output from the light metering section 154. Further, based on the calculated Bv value, the camera microcomputer 101 calculates shooting conditions, such as settings of the Av value and the ISO sensitivity in the Tv priority mode, settings of the Tv value and the ISO sensitivity in the Av priority mode, or settings of the Tv value, the Av value, and the ISO sensitivity in the program exposure mode.

Now, the computation in each of the exposure modes will be described in detail with reference to FIGS. 3 to 5 before continuing the description of the process in FIGS. 2A and 2B.

If the exposure mode read in the step S102 in FIG. 2A is the Tv priority mode, an Av value and an ISO sensitivity (Sensitivity value: Sv) are calculated from a program diagram for the Tv priority mode shown in FIG. 3, based on the Bv value calculated in the step S108 and the Tv value read in the step S104. For exposure calculation, there are used the following equations:

$$Bv = Tv + Av - Sv \quad (1)$$

$$Tv = -\log_2(\text{shutter speed}) \quad (2)$$

$$Av = 2\log_2(f\text{-number}) \quad (3)$$

$$Sv = \log_2(0.3 \times ISO \text{ sensitivity}) \quad (4)$$

When the equations (2), (3), and (4) are tabulated, relationship between the shutter speed, the aperture value, and the sensitivity value shown in FIG. 18 is obtained.

Figure 3:
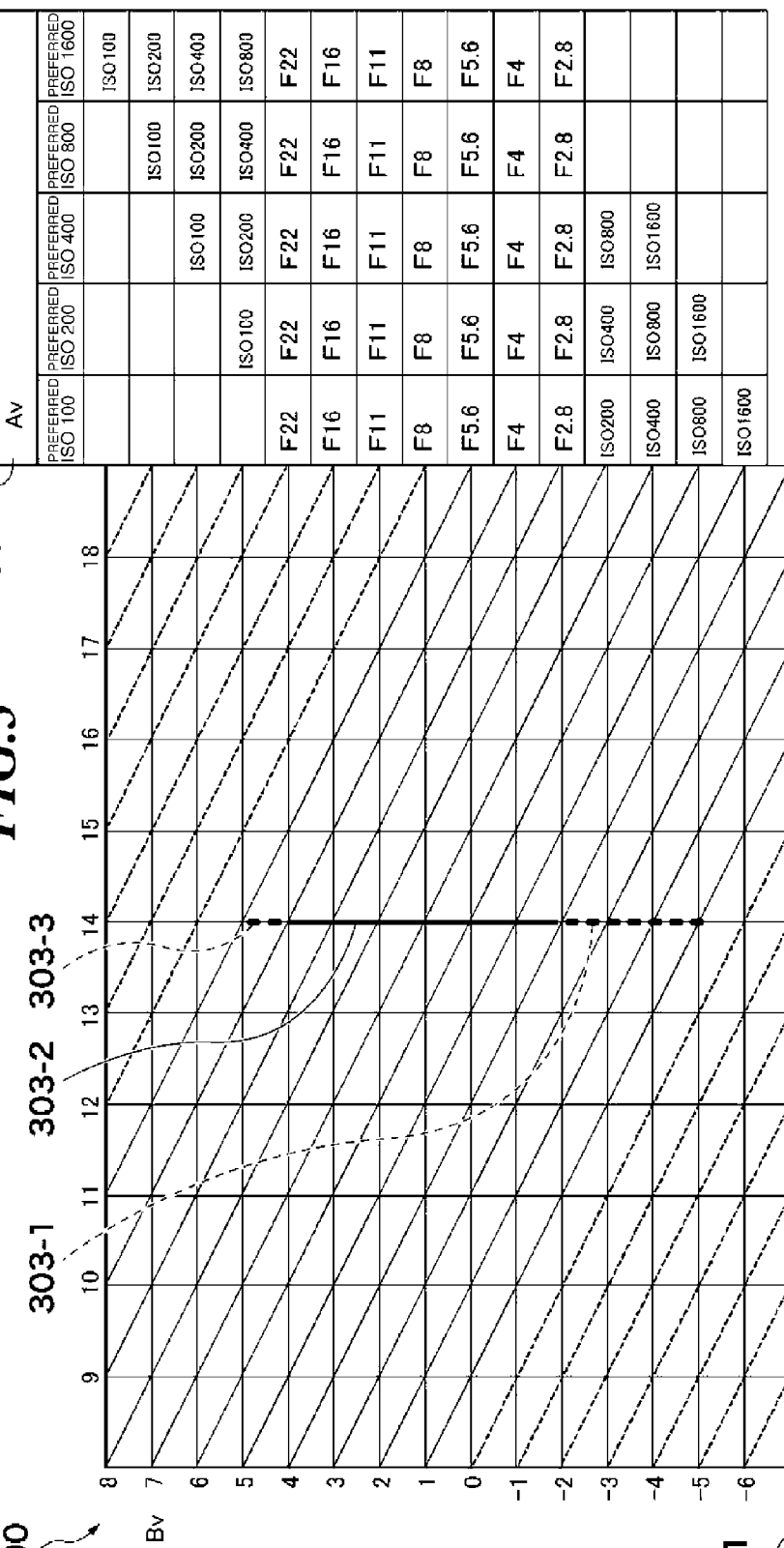
FIG. 3 is a program diagram for a Tv priority mode of the digital camera.

FIG. 3 shows an example of the program diagram for the Tv priority mode.

In FIG. 3, reference numeral 300 denotes Bv value settings. Reference numeral 301 denotes Tv value settings one of which is to be read in the step S104 in FIG. 2A. If the ISO sensitivity setting read in the step S107 in FIG. 2A is ISO 100 fixed or ISO 100 preferred in auto ISO, an uppermost row of the Tv value settings 301 is used.

Thus, it is assumed hereafter that a row of the Tv value settings 301 corresponding to a fixed or preferred ISO value read in the step S107, is used, as in the case of ISO 100 fixed or ISO 100 preferred in auto ISO.

Reference numeral 302 denotes Av value settings one of which is to be set by the camera microcomputer 101 according to a Bv value and a set Tv value, and auto ISO settings one of which is to be set in the auto ISO sensitivity mode. If the ISO sensitivity setting read in the step S107 in FIG. 2A is ISO 100 fixed or ISO 100 preferred in auto ISO, a leftmost column of the Av value & auto ISO settings 302 is used.

Thus, it is assumed hereafter that a row of the Av value & auto ISO settings 302 corresponding to the fixed or preferred ISO value read in the step S107, is used, as in the case of ISO 100 fixed or ISO 100 preferred in auto ISO.

For example, assuming that the Tv value is set to 1/125, the ISO sensitivity is set to ISO 200 preferred in auto ISO, and the interlocking range of Av values of the lens unit 200 is F2.8 to F22, a Tv setting of 1/125 in a position in the second uppermost row of the Tv value settings 301 and a second leftmost column of the Av value & auto ISO settings 302 are used. As the program diagram associated with brightness values Bv, a dotted line segment 303-1, a solid line segment 303-2, and a dotted line segment 303-3 are used (when the ISO sensitivity is set to ISO 200 fixed, only the solid line segment 303-2 is used). It should be noted that in a case where auto ISO is set in the Tv priority mode, the program diagram may be configured such that the Av value and the ISO sensitivity can be changed simultaneously instead of being changed separately.

Figure 4:
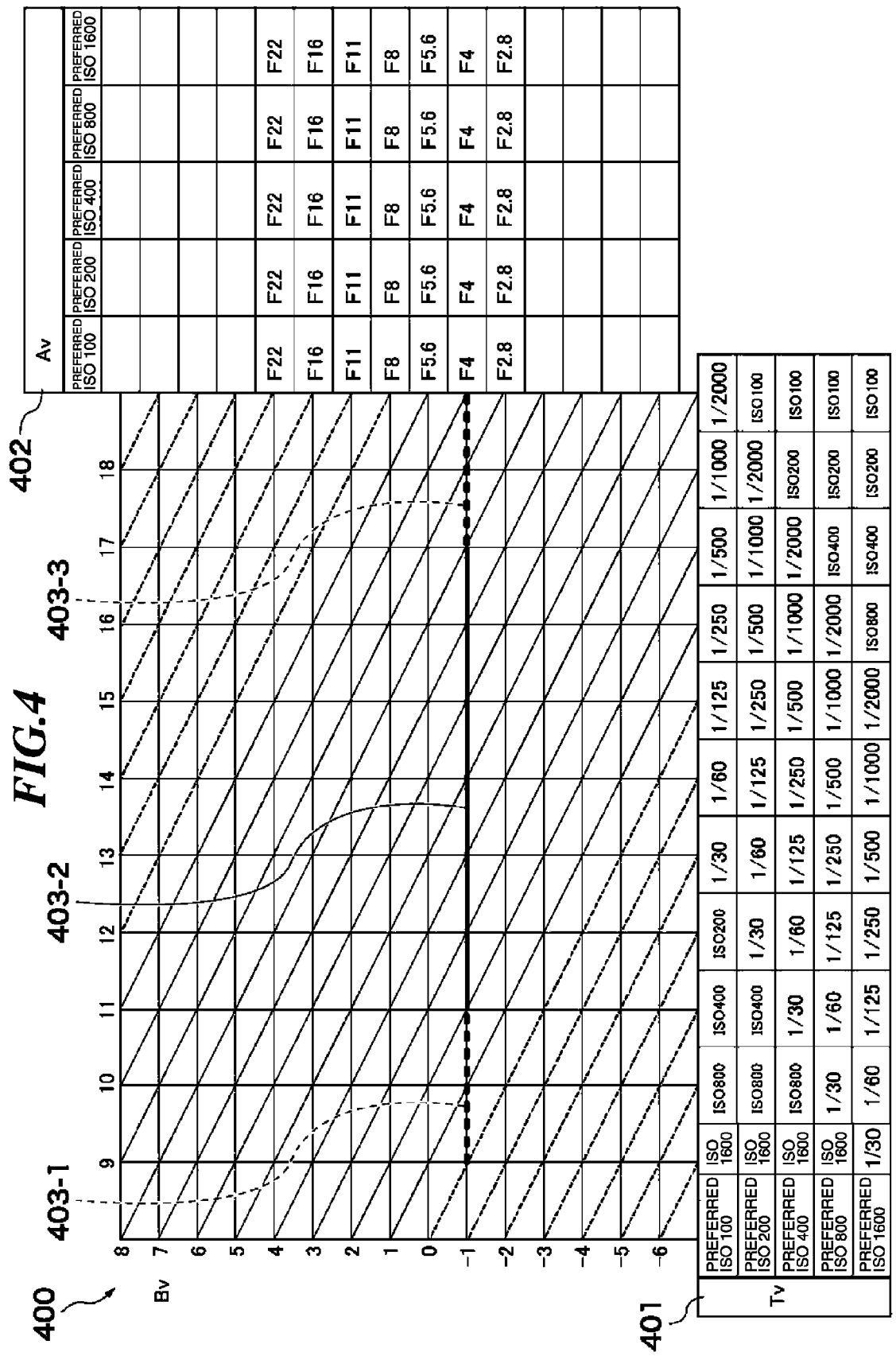
FIG. 4 is a program diagram for an Av priority mode of the digital camera.

If the exposure mode read in the step S102 in FIG. 2A is the Av priority mode, the camera microcomputer 101 calculates a Tv value and an ISO sensitivity from a program diagram for the Av priority mode shown in FIG. 4, based on the Bv value calculated in the step S108 and the Av value read in the step S106. For exposure calculation, there are used the same equations (1), (2), (3), and (4) as used in the Tv priority mode.

FIG. 4 shows an example of the program diagram for the Av priority mode.

Referring to FIG. 4, reference numeral 400 denotes Bv value settings. Reference numeral 401 denotes Tv value settings one of which is to be set by the camera microcomputer 101 according to a Bv value and a set Av value, and auto ISO settings one of which is to be set in the auto ISO sensitivity setting mode. If the ISO sensitivity setting read in the step S107 in FIG. 2A is ISO 100 fixed or ISO 100 preferred in auto ISO, an uppermost row of the Tv value & auto ISO settings 401 is used.

Thus, it is assumed hereafter that a row of the Tv value & auto ISO settings 401 corresponding to the fixed or preferred ISO value read in the step S107, is used, as in the case of ISO 100 fixed or ISO 100 preferred in auto ISO.

Reference numeral 402 denotes Av value settings one of which is to be set in the step S106 in FIG. 2A. If the ISO sensitivity setting read in the step S107 in FIG. 2A is ISO 100 fixed or ISO 100 preferred in auto ISO, a leftmost column of the Av value settings 402 is used.

Thus, it is assumed hereafter that a row of the Av value settings 402 corresponding to the fixed or preferred ISO value read in the step S107, is used, as in the case of ISO 100 fixed or ISO 100 preferred in auto ISO.

For example, assuming that the Av value is set to F4, and the ISO sensitivity is set to ISO 400 preferred in auto ISO, an Av setting of F4 in a position in a third leftmost column of the Av value settings 402 and a third uppermost row of the Tv value & auto ISO settings 401 are used. As the program diagram associated with brightness values Bv, a dotted line segment 403-1, a solid line segment 403-2, and a dotted line segment 403-3 are used (when the ISO sensitivity is set to ISO 400 fixed, only the solid line segment 403-2 is used). It should be noted that in a case where auto ISO is set in the Av priority mode, the program diagram may be configured such that the Tv value and the ISO sensitivity can be changed simultaneously instead of being changed separately.

Figure 5:
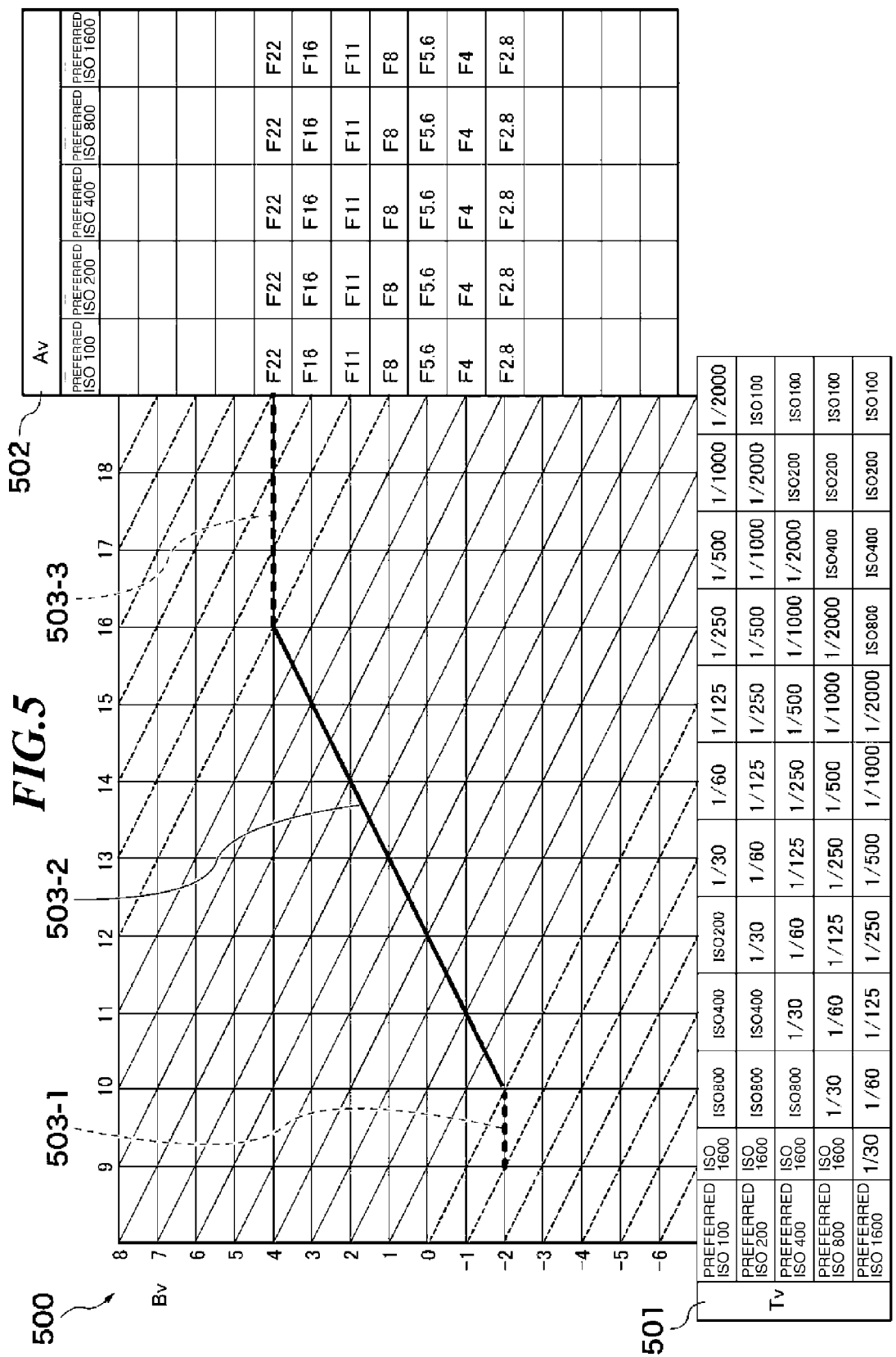
FIG. 5 is a program diagram for a program exposure mode of the digital camera.

If the exposure mode read in the step S102 in FIG. 2A is the program exposure mode, the camera microcomputer 101 calculates a Tv value, an Av value, and an ISO sensitivity from a program diagram for the program exposure mode shown in FIG. 5, based on the Bv value calculated in the step S108. For exposure calculation, there are used the same equations (1), (2), (3), and (4) as used in the Tv priority mode.

FIG. 5 shows an example of the program diagram for the program exposure mode.

In FIG. 5, reference numeral 500 denotes Bv value settings. Reference numeral 501 denotes Tv value settings one of which is to be set by the camera microcomputer 101 according to a Bv value, and auto ISO settings one of which is to be set in the auto ISO sensitivity setting mode. If the ISO sensitivity setting read in the step S107 in FIG. 2A is ISO 100 fixed or ISO 100 preferred in auto ISO, an uppermost row of the Tv value & auto ISO settings 501 is used.

Thus, it is assumed hereafter that a row of the Tv value & auto ISO settings 501 corresponding to the fixed or preferred ISO value read in the step S107, is used, as in the case of ISO 100 fixed or ISO 100 preferred in auto ISO.

Reference numeral 502 denotes Av value settings one of which is to be set by the camera microcomputer 101 according to a Bv value. If the ISO sensitivity setting read in the step S107 in FIG. 2A is ISO 100 fixed or ISO 100 preferred in auto ISO, a leftmost column of the Av value settings 502 is used.

Thus, it is assumed hereafter that a row of the Av value settings 502 corresponding to the fixed or preferred ISO value read in the step S107, is used, as in the case of ISO 100 fixed or ISO 100 preferred in auto ISO.

For example, assuming that the interlocking range of Av values of the lens unit 200 is set to F2.8 to F22 and the ISO sensitivity is set to ISO 800 preferred in auto ISO, a fourth leftmost column of the Av value settings 502 and a fourth uppermost row of the Tv value & auto ISO settings 501 are used. As the program diagram associated with brightness values Bv, a dotted line segment 503-1, a solid line segment 503-2, and a dotted line segment 503-3 are used (when the ISO sensitivity is set to ISO 800 fixed, only the solid line segment 503-2 is used). It should be noted that in a case where auto ISO is set in the program exposure mode, the program diagram may be configured such that the Tv value, the Av value, and the ISO sensitivity can be changed simultaneously instead of being changed separately.

When the manual exposure mode is selected and at the same time auto ISO is set, computation is performed based on the set Tv value read in the step S104 in FIG. 2A or the set Av value read in the step S106, so as to obtain an ISO sensitivity fully or most closely satisfying the relationship expressed by the equation (1).

Next, a description will be given of the continuation of the flowchart in FIGS. 2A and 2B.

Referring again to FIGS. 2A and 2B, the camera microcomputer 101 determines whether or not the moving image shooting start switch has been pressed (step S109). If the moving image shooting start switch has been pressed to give an instruction for starting moving image shooting, the camera microcomputer 101 proceeds to a step S112. The step S112 and the following steps S113 to S122, which are executed during moving image shooting, will be described hereinafter. If the moving image shooting start switch has not been pressed, the camera microcomputer 101 determines whether or not the power switch has been pressed to give an instruction for terminating the operation (step S110). If the instruction has not been given, the process returns to the step S101. If the instruction has been given, the camera microcomputer 101 stops the operation, followed by terminating the present process (step S111).

When the moving image shooting start switch is pressed, the camera microcomputer 101 sets the Tv value, the Av value, and the ISO sensitivity to respective values for a designated exposure mode, which were calculated in the step S108 according to the photometric value Bv (step S112). Further, the camera microcomputer 101 shifts the main mirror 150 to the shooting position 150B and causes the front curtain of the shutter 155 to travel.

Then, the camera microcomputer 101 performs control and computation as follows (step S113): The camera microcomputer 101 operates the TG 104 to periodically cause the image pickup element 102 to form an image of the object light having passed through the photographic lens 202 and exposed to the image pickup element 102. Further, the camera microcomputer 101 operates the analog-to-digital converter 103 and the digital signal processor 105 to store moving image shooting information (picked-up image) in the image recording unit 107. The camera microcomputer 101 calculates a Bv value for correct exposure, again, based on the picked-up image and the settings of the ISO sensitivity, the Tv value, and the Av value.

Then, the camera microcomputer 101 determines whether or not the exposure mode is either the program exposure mode or the Tv priority mode (step S114). If the exposure mode is not either the program exposure mode or the Tv priority mode, the program proceeds to a step S116. If the exposure mode is either the program exposure mode or the Tv priority mode, the camera microcomputer 101 calculates an Av value based on the Bv value recalculated in the step S113, and sends the Av value to the lens microcomputer 201 to cause the lens microcomputer 201 to set the Av value (step S115), and then proceeds to the step S116.

Then, the camera microcomputer 101 determines whether or not the exposure mode is either the program exposure mode or the Av priority mode (step S116). If the exposure mode is not either the program exposure mode or the Av priority mode, the camera microcomputer 101 proceeds to a step S118. If the exposure mode is either the program exposure mode or the Av priority mode, the camera microcomputer 101 calculates a Tv value based on the Bv value recalculated in the step S113, and sets the Tv value corresponding to the Bv value in the TG 104 (step S117), and then proceeds to the step S118.

Then, the camera microcomputer 101 determines whether or not auto ISO has been set (step S118). If auto ISO has not been set, the camera microcomputer 101 proceeds to a step S120. If auto ISO has been set, the camera microcomputer 101 calculates an ISO value based on the Bv value recalculated in the step S113, and sets the ISO value corresponding to the Bv value in the TG 104 (step S119), and then proceeds to the step S120.

Then, the camera microcomputer 101 displays the image picked up by the image pickup element 102 in the step S113 on the image display section 106. The camera microcomputer 101 also causes the image display section 106 to display interlocking ranges of time values Tv, Av values, and ISO values defined in association with a Bv value for correct exposure in the associated exposure mode (step S120). Display control of the image display section 106 in the step S120 will be described in detail hereinafter on an exposure mode-by-exposure mode basis.

Then, the camera microcomputer 101 determines whether or not the power switch has been pressed to give an instruction for terminating the moving image shooting operation (step S121). If the moving image shooting end instruction has not been issued, the process returns to the step S113. If the instruction has been issued, the camera microcomputer 101 causes the rear curtain of the shutter 155 to travel and the main mirror 150 to shift to the viewing position 150A, and causes the diaphragm 205 to be brought into an open state by communicating with the lens microcomputer 201, followed by terminating the moving image shooting operation (step SS122). Thereafter, the camera microcomputer 101 returns to the step S101.

Next, display of the image display section 106 in each of the exposure modes will be described.

First, with reference to FIG. 6, a description will be given of display of the image display section 106 in a case where the exposure mode read in the step S102 in FIG. 2A is the manual exposure mode.

Figure 6:
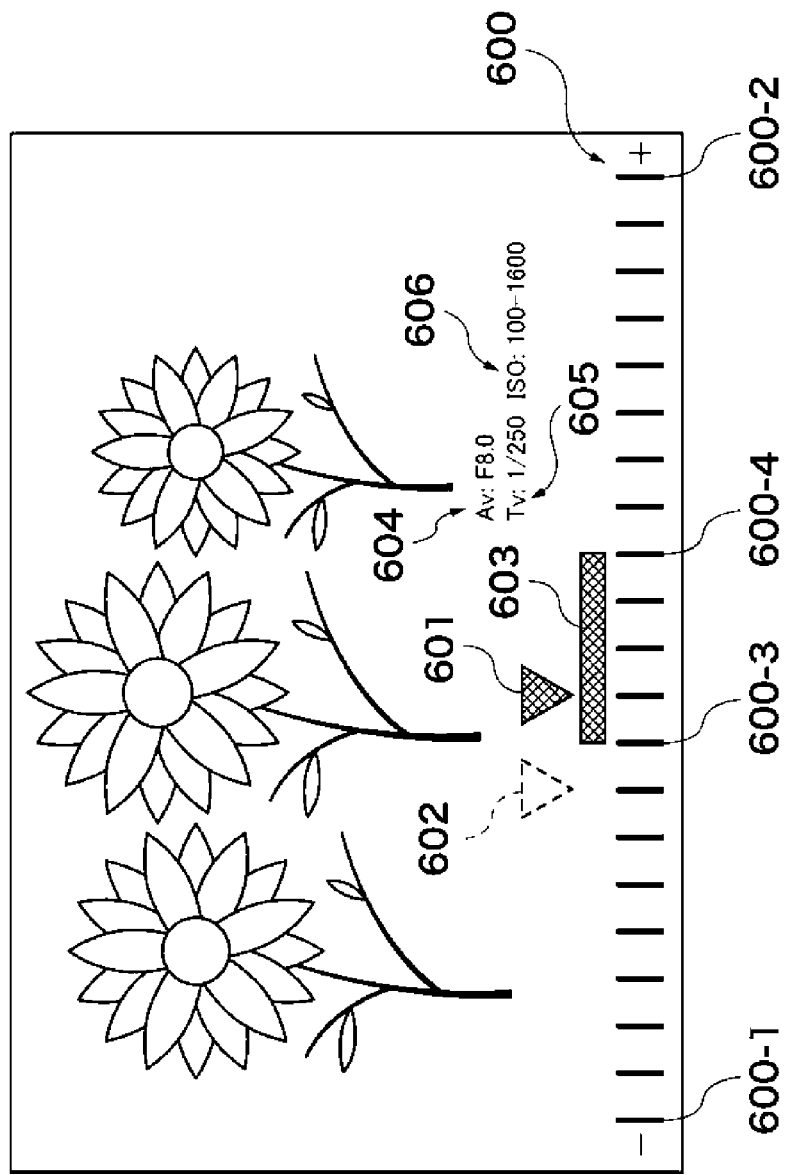
FIG. 6 is a view of a display state of an image display section in a manual exposure mode of the digital camera.

FIG. 6 illustrates a state of the image display section 106 currently performing moving image recording when an Av value of F8, a Tv value of ½50, and auto ISO (interlocking range of ISO 100 to ISO 1600) are set in the manual exposure mode.

In FIG. 6, a scale 600 provided in the lowermost part of a screen displaying an image currently being shot is calibrated such that each step indicates an interlocking range of Bv values defined by settings for exposure. A left-end marking 600-1 indicates a Bv value of −3 on an underexposure side, and a right-end marking 600-2 indicates a Bv value of 17 on an overexposure side. Further, from the above-mentioned equation (1), when an Av value of F8, a Tv value of ½50, and auto ISO (interlocking range of ISO 100 to ISO 1600) are set, a Bv value for correct exposure is in a range of 5 to 9, and hence an interlocking range of Bv values associated with the interlocking range of ISO sensitivities for correct exposure is indicated by reference numeral 603 (on the interlocking range 603 of Bv values for correct exposure, a position corresponding to a marking 600-3 on the scale 600 indicates a Bv value of 5 and a position corresponding to a marking 600-4 on the same indicates a Bv value of 9).

Reference numeral 601 denotes an indicator for indicating a Bv value for correct exposure recalculated in the step S113 in FIG. 2B. In FIG. 6, the indicator 601 indicates a Bv value of 6, so that the user can know that the Bv value is within the interlocking range for correct exposure defined by auto ISO. Assuming that the indicator for indicating a Bv value for correct exposure is displayed at a position denoted by reference numeral 602, the indicator indicates a Bv value of 4, and hence the user can know that the Bv value is at an underexposure level one step lower than the interlocking range of Bv values for correct exposure defined by auto ISO. Further, reference numeral 604 denotes a setting of the Av value, reference numeral 605 denotes a setting of the Tv value, and reference numeral 606 denotes the interlocking range of ISO sensitivities. Alternatively, display may be performed as shown in FIGS. 19A to 19J, based on the By value for correct exposure recalculated in the step S113 in FIG. 2B, the Tv value read in the step S104 in FIG. 2A, the Av value read in the step S106, and the ISO sensitivity setting read in the step S107.

FIGS. 19A to 19J are diagrams each illustrating a difference between a correct exposure level which is associated with a Bv value (which is changed in steps of 0.5 between the diagrams) and a setting of an exposure level, and an interlocking range of correct exposure levels.

Figure 19A:
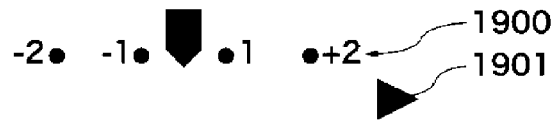
FIGS. 19A to 19J are respective views of derivatives of the display state of the image display section of the digital camera according to the first embodiment.

More specifically, in each of respective displays illustrated in FIGS. 19A to 19J in association with respective Bv values which changes in steps of 0.5, reference numeral 1900 denotes a display of exposure levels associated with a Bv value. In the display 1900, a central marking corresponds to a position of a correct exposure level, a left-end marking corresponds to a position of a level of underexposure lower than the correct exposure level by two steps, and a right-end marking corresponds to a position of a level of overexposure higher than the correct exposure level by two steps. Reference numeral 1901 denotes a mark for indicating of a difference between an exposure level determined by the settings of the Tv value, the Av value, and the ISO sensitivity, and the correct exposure level associated with the Bv value, and reference numeral 1902 denotes the interlocking range of Bv values for correct exposure. For example, in image display during moving image shooting performed with an Av value of F8, a Tv value of 1/250, and auto ISO (interlocking range of ISO 100 to ISO 1600), the interlocking range of Bv values for correct disposure is determined to be a range of 5 to 9, from the relationship expressed by the equations (1) to (4). More specifically, FIG. 19A shows a case where the brightness of an object is not lower than a Bv value of 11.5, and the Av value of F8 and the Tv value of 1/250 are set, while the ISO sensitivity is assumed to be set to ISO 100 by recalculation in the step S113 in FIG. 2B as an ISO sensitivity closest to one for correct exposure, the brightness resulting from the exposure corresponds to a Bv value of 9. For this reason, a right-pointed triangle indicative of overexposure higher than the correct exposure level by two or more steps is displayed as the mark 1901 indicating the difference from the correct exposure level, and the mark 1902 indicative of an interlocking range of Bv values for correct exposure is not displayed.

Figure 19B:
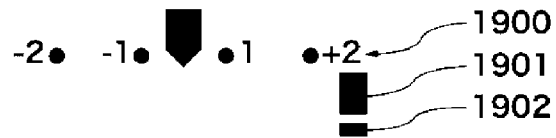

FIG. 19B shows a case where the Bv value is equal to 11. In this case, the mark 1901 indicative of a difference from the correct exposure level is displayed at a position of overexposure higher than the correct exposure level by two steps, and the mark 1902 indicative of an interlocking range of Bv values for correct exposure is also displayed at this position.

Figure 19C:
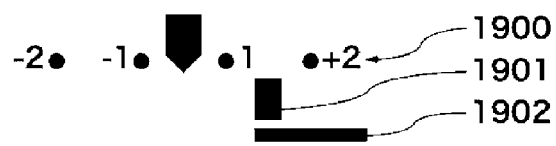
Figure 19D:
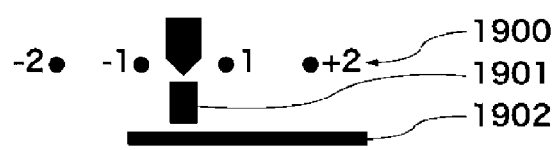

In the following figures, the Bv value becomes lower in steps of 0.5, and as shown in FIG. 19C, as the position of the mark 1901 indicative of a difference from the correct exposure level moves, the mark 1902 indicative of an interlocking range of Bv values for correct exposure becomes longer. As the Bv value becomes further lower by a step of 0.5, the mark 1901 indicative of a difference from the correct exposure level stops at the position of the correct exposure level e.g. as shown in FIG. 19D, and the mark 1902 indicative of an interlocking range of Bv values for correct exposure becomes more longer.

Figure 19E:
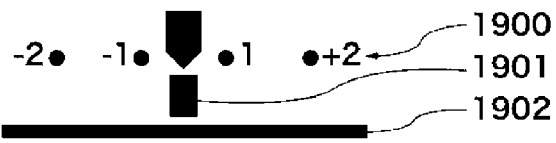
Figure 19F:
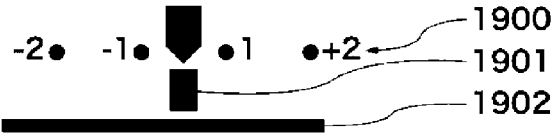

FIG. 19E shows a case where the Bv value is equal to 7. In this case, since the ISO sensitivity setting recalculated in the step S113 in FIG. 2B is ISO 400 and the interlocking range of ISO sensitivities is ISO 100 to ISO 1600, the mark 1902 indicative of an interlocking range of Bv values for correct exposure is displayed in a manner extending from a position of underexposure lower than the correct exposure level by two steps to the position of overexposure higher than the correct exposure level by two steps. In other words, the user can know that correct exposure is currently ensured and the interlocking range of Bv values permitting shooting with correct exposure without changing the set Tv value or the set Av value extends toward the underexposure side over two steps and the overexposure side over two steps. In this case, the length of the mark 1902 indicative of an interlocking range for correct exposure is maximum. When the Bv value becomes further lower by a step of 0.5, the mark 1901 indicative of a difference from the correct exposure level remains at the position of the correct exposure level as shown in FIG. 19F, and the mark 1902 indicative of an interlocking range of Bv values for correct exposure becomes shorter.

Figure 19G:
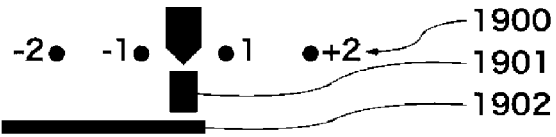

FIG. 19G shows a case where the Bv value is equal to 5. In this case, since the ISO sensitivity setting recalculated in the step S113 in FIG. 2B is ISO 1600 and the interlocking range of ISO sensitivities is ISO 100 to ISO 1600, the mark 1902 indicative of an interlocking range of Bv values for correct exposure is displayed in a manner extending from the position of underexposure lower than the correct exposure level by two steps to the correct exposure position.

Figure 19H:
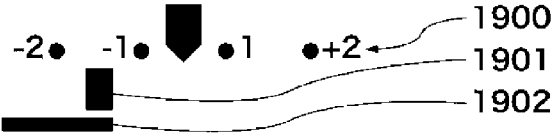
Figure 19I:
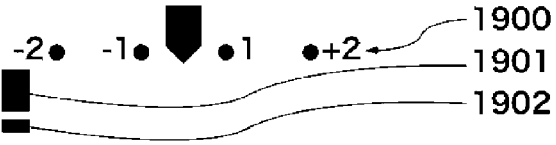
Figure 19J:

Further, as the Bv value becomes lower in steps of 0.5, the position of the mark 1901 indicative of a difference from the correct exposure level moves, as shown in FIGS. 19H and 19I, and the mark 1902 indicative of an interlocking range of Bv values for correct exposure becomes even shorter. In a case shown in FIG. 19J, where the Bv value is 2.5 or lower, i.e. the brightness is low, a left-pointed triangle indicative of underexposure by two or more steps is displayed as the mark 1901 indicative of a difference from the correct exposure level, and the mark 1902 indicative of an interlocking range of Bv values for correct exposure is not displayed.

Next, with reference to FIG. 7, a description will be given of display of the image display section 106 in a case where the exposure mode read in the step S102 in FIG. 2A is the Tv priority mode.

Figure 7:
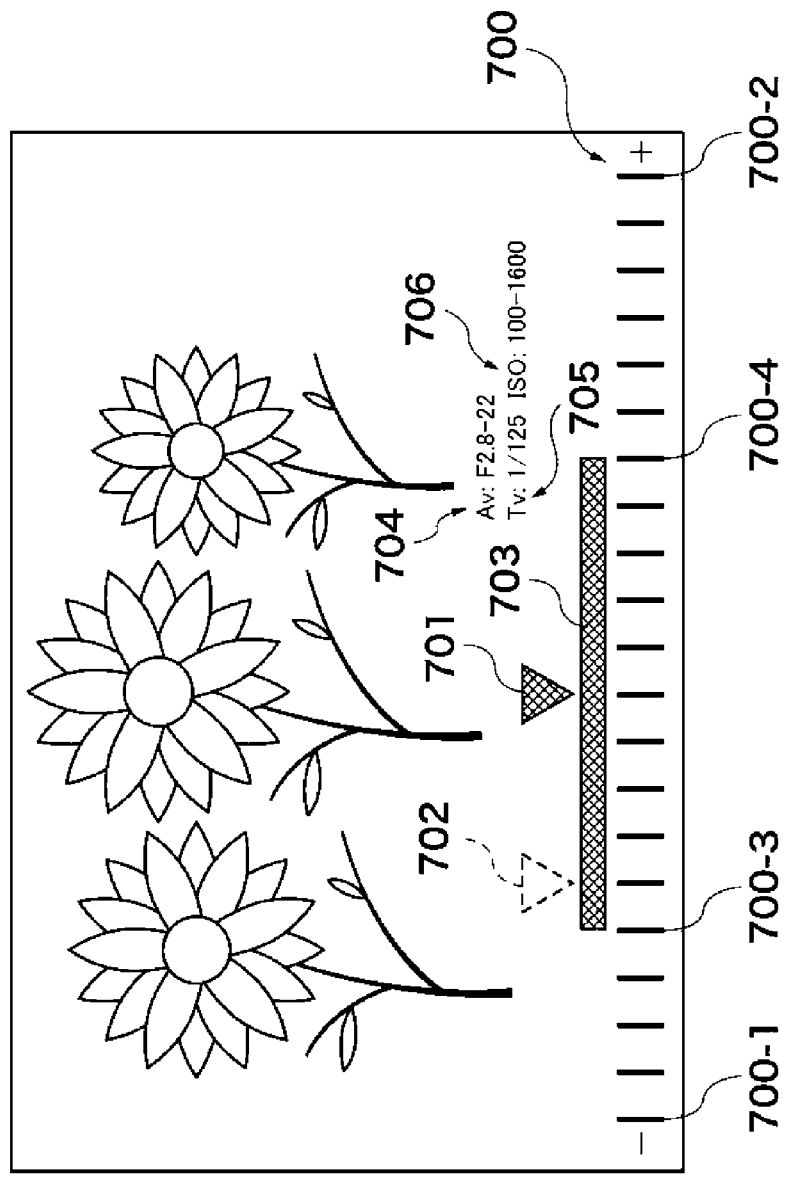
FIG. 7 is a view of a display state of the image display section in the Tv priority mode of the digital camera.

FIG. 7 illustrates a state of the image display section 106 currently performing moving image recording when a Tv value of 1/125, and an interlocking range of Av values of F2.8 to F22, and ISO 200 preferred (interlocking range of ISO 100 to ISO 1600) are set in the Tv priority mode.

Referring to FIG. 7, reference numerals correspond to those in FIG. 6, respectively, and reference numeral 703 denotes an interlocking range of Bv values when the Tv value is set to 1/125 and the Av value and the ISO sensitivity vary in an interlocked manner for correct exposure as indicated by 303-1, 303-2, and 303-3 in FIG. 3. More specifically, an interlocking range of Bv values from a Bv value of 1 to a Bv value of 11 is obtained from the FIG. 3 program diagram, and therefore the interlocking range 703 is displayed as a range extending from a position indicated by a marking 700-3 on a scale 800 corresponding to the By value of 1 to a position indicated by a marking 700-4 on the same corresponding to the Bv value of 11.

Reference numeral 701 denotes the indicator for indicating a Bv value for correct exposure recalculated in the step S113 in FIG. 2B. In FIG. 7, the indicator 701 indicates a Bv value of 6, so that the user can know that the interlocking range of By values permitting shooting with correct exposure without changing the set Tv value of $1/125$ is from a position of underexposure lower than the position indicated by the indicator 701 by five steps to a position of overexposure higher than the same by five steps, and hence it is possible to obtain correct exposure even if the brightness of ambient light changes more or less. Assuming that the indicator for indicating a Bv value for correct exposure is at a position 702, a portion of the interlocking range on the underexposure side corresponds to only one step, so that the user can know that if the ambient light becomes darker by more than one step, underexposure occurs.

Figure 8:
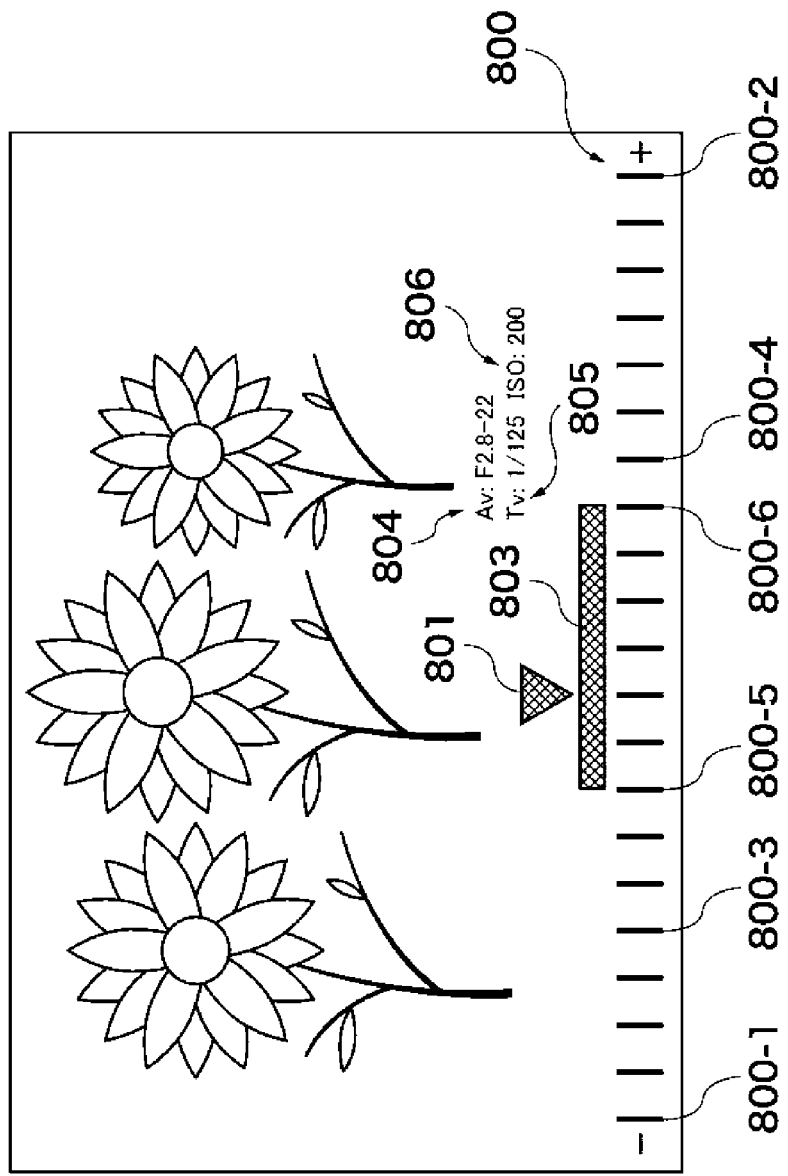
FIG. 8 is a view of a display state of the image display section in the Tv priority mode of the digital camera and in a state where an ISO sensitivity is fixed.

FIG. 8 illustrates a state of the image display section 106 currently performing moving image recording when a Tv value of $1/125$, and an interlocking range of Av values of F2.8 to F22, and ISO 200 fixed are set in the Tv priority mode.

FIG. 8 is distinguished from FIG. 7 in that the ISO setting (setting of ISO sensitivity) is not auto ISO. When the ISO setting is fixed to ISO 200, the Tv value remains set to $1/125$, and the interlocking range of Av values is as indicated by 303-2 in FIG. 3. Therefore, the interlocking range 803 of Bv values is displayed as a range extending from a position indicated by a marking 800-5 on a scale 700 corresponding to a Bv value of 4 to a position indicated by a marking 800-6 on the same corresponding to a Bv value of 10. Further, the ISO sensitivity value denoted by reference numeral 806 is displayed as ISO 200 fixed.

Next, with reference to FIG. 9, a description will be given of display of the image display section 106 in a case where the exposure mode read in the step S102 in FIG. 2A is the Av priority mode.

Figure 9:
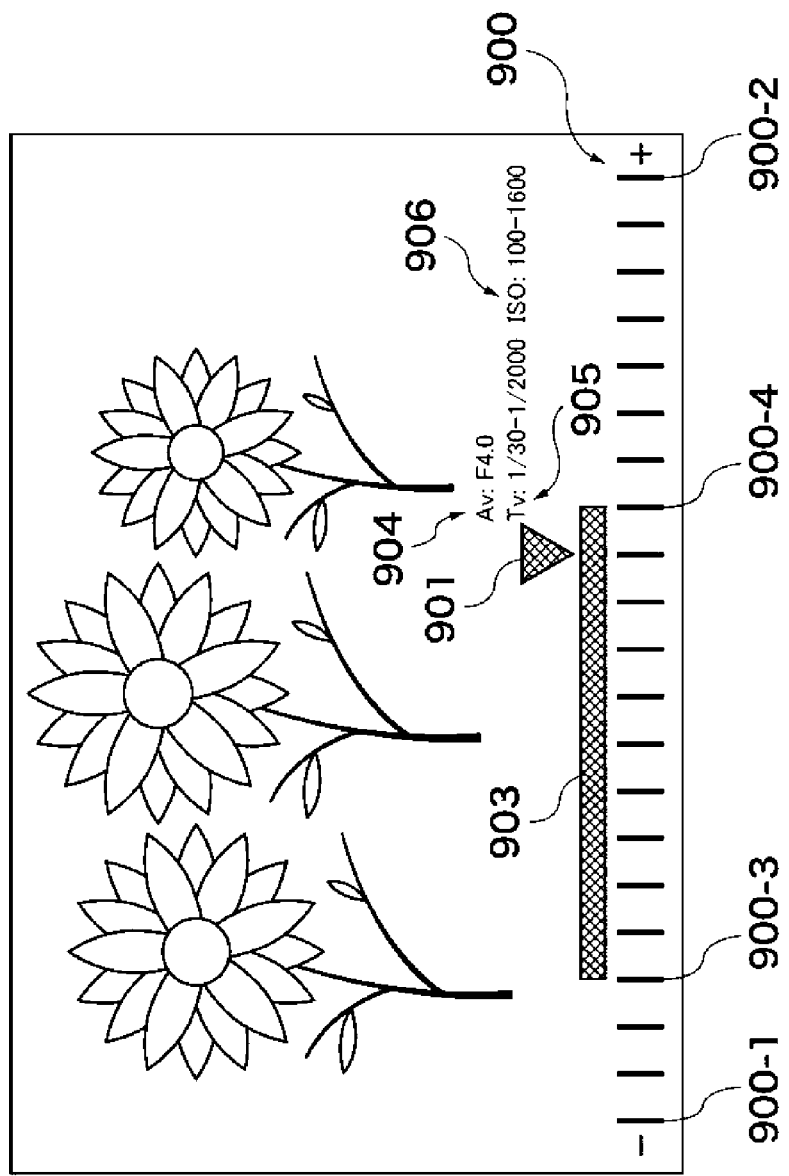
FIG. 9 is a view of a display state of the image display section in the Av priority mode of the digital camera.

FIG. 9 illustrates a state of the image display section 106 currently performing moving image recording when an Av value of F4, and a Tv value interlocking range of $1/30$ to $1/2000$, auto ISO, and ISO 400 preferred (interlocking range of ISO 100 to ISO 1600) are set in the Av priority mode.

In FIG. 9, reference numerals correspond to those in FIG. 6, respectively, and reference numeral 903 denotes an interlocking range of Bv values when the Av value is set to F4 and the Tv value and the ISO sensitivity vary in an interlocked manner for correct exposure as indicated by 403-1, 403-2, and 403-3 in FIG. 4. More specifically, an interlocking range of Bv values from a Bv value of 0 to a Bv value of 10 is obtained from the FIG. 4 program diagram, and therefore an interlocking range 903 is displayed as a range extending from a position indicated by a marking 900-3 on a scale 900 corresponding to the Bv value of 0 to a position indicated by a marking 900-4 on the same corresponding to the Bv value of 10.

Reference numeral 901 denotes the indicator for designating a position of a Bv value for the correct exposure recalculated in the step S113 in FIG. 2B. In FIG. 9, the indicator 901 designates a Bv value of 9, so that the user can know that the interlocking range permitting shooting with correct exposure is from a position of underexposure lower than the position indicated by the indicator 901 by nine steps to a position of overexposure higher than the same by one step.

Next, with reference to FIG. 10, a description will be given of display of the image display section 106 in a case where the exposure mode read in the step S102 in FIG. 2A is the program exposure mode.

Figure 10:
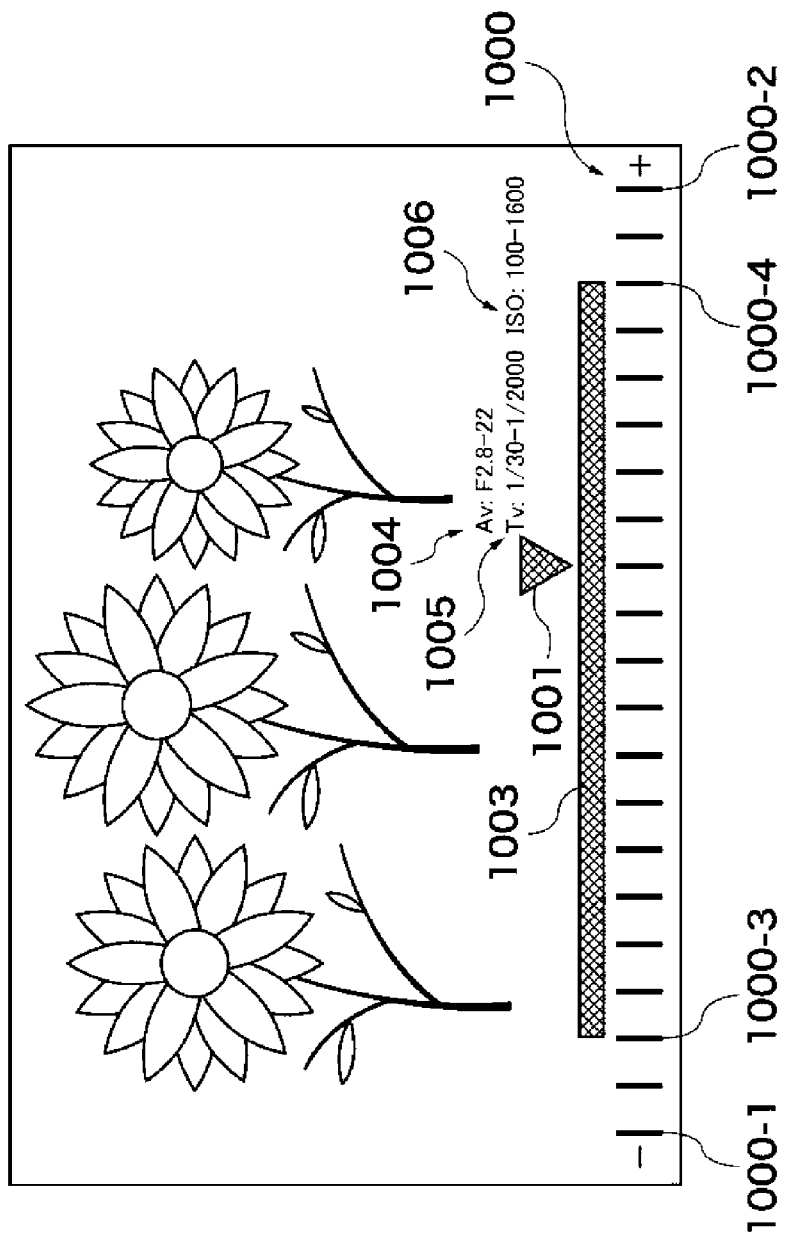
FIG. 10 is a view of a display state of the image display section in the program exposure mode of the digital camera.

FIG. 10 illustrates a state of the image display section 106 currently performing moving image recording when an Av interlocking range of F2.8 to F22, a Tv interlocking range of $1/30$ to $1/2000$, auto ISO, and ISO 800 preferred (interlocking range of ISO 100 to ISO 1600) are set in the program exposure mode.

In FIG. 10, reference numerals correspond to those in FIG. 6, respectively, and reference numeral 1003 denotes an interlocking range of Bv values which vary according to the line segments 503-1, 503-2, and 503-3 of the program diagram for correct exposure. More specifically, an interlocking range of Bv values from a Bv value of −1 to a Bv value of 15 is obtained from the FIG. 5 program diagram, and therefore an interlocking range 1003 is displayed as a range extending from a position indicated by a marking 1000-3 on a scale 1000 corresponding to the Bv value of −1 to a position indicated by a marking 1000-4 on the same corresponding to the Bv value of 15.

Reference numeral 1001 denotes the indicator for designating a Bv value for correct exposure recalculated in the step S113 in FIG. 2B. In FIG. 10, the indicator 1001 designates a Bv value of 9, so that the user can know that the interlocking range permitting shooting with correct exposure is from a position of underexposure lower than the position indicated by the indicator 1001 by ten steps to a position of overexposure higher than the same by six steps.

Although each of the scales 600 to 1000 displayed on the image display section 106 to show the respective interlocking ranges as shown in FIGS. 6 to 10 is configured to have the left-end marking corresponding to a Bv value of −3 and the right-end marking corresponding to a Bv value of 17, the ranges and intervals between the markings may be changed e.g. by configuration. Further, each of the scales 600 to 1000 may be configured to have markings arranged such that the associated one of the interlocking ranges 603 to 1003 shown in FIGS. 6 to 10 extends leftward and rightward in a symmetrical manner with respect to the center of the image.

Figure 11:
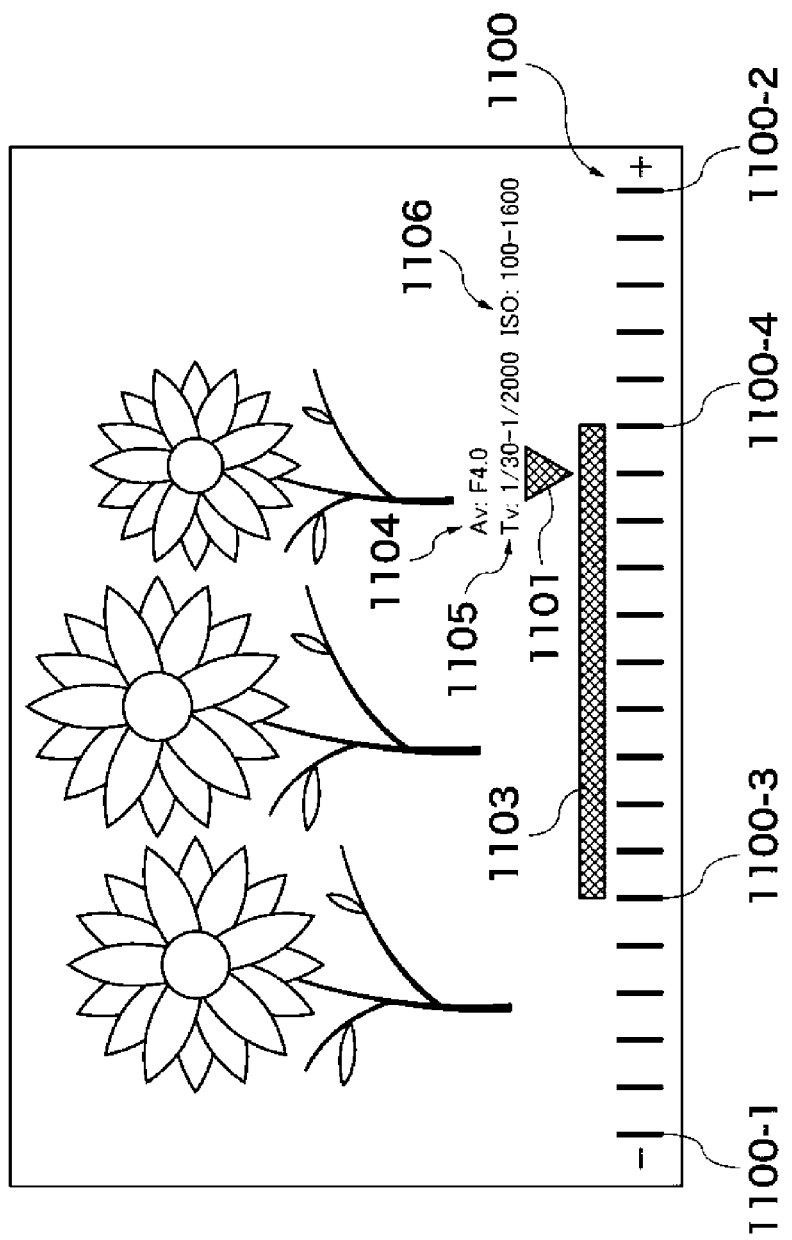
FIG. 11 is a view of a derivative of the display state of the image display section in the Av priority mode of the digital camera.

For example, although in FIG. 9, the scale 900 for indicating an interlocking range of Bv values for correct exposure has the left-end marking 900-1 corresponding to a Bv value of −3 and the right-end marking 900-2 corresponding to a Bv value of 17, the display of the scale 900 may be changed by shifting the Bv values corresponding to the left-end and right-end markings as in FIG. 11 such that an interlocking range 1103 extends symmetrically in the left-right direction with respect to the center of the image.

More specifically, FIG. 11 is a derivative of the display state of the image display section 106 in the Av priority mode shown in FIG. 9, and the exposure parameter interlocking range 1103 ranges from a Bv value of 0 to a Bv value of 10. Therefore a scale 1100 for an interlocking range of Bv values has a left-end marking 1100-1 corresponding to a Bv value of −5 and a right-end marking 1100-2 corresponding to a Bv value of 15.

As described above, according to the present embodiment, the user can know shooting conditions for obtaining correct exposure in a manner associated with corresponding interlocking ranges of Tv values, Av values, and ISO sensitivities from the display on the image display section 106. Thus, even if ambient light changes, the user can foresee whether shooting is possible within an interlocking range for correct exposure.

More specifically, an indication indicating a correct exposure level and an range of exposure (in terms of Bv values) controllable in an interlocking manner with items to be automatically changed by the digital camera main unit, i.e. the items except those set by the user, are displayed on the image display section 106. This makes it is possible, when ambient brightness changes before shooting, to inform the user of a guide for determination as to whether shooting can be performed with correct exposure or whether shooting can be performed with correct exposure without changing the set Tv value or the set Av value.

A second embodiment of the present invention is distinguished from the first embodiment only by the display operation of the image display section 106 executed in the step S120 in FIG. 2B. In the following, different points from the first embodiment will be described with reference to FIGS. 12 and 13.

In the step S120 in FIG. 2B, the image display section 106 displays the image shot in the step S113 and ones of interlocking ranges of Tv values, Av values, and ISO sensitivities, associated with a Bv value for correct exposure, in a selected exposure mode. Hereafter, a detailed description will be given of display control of the image display section 106 in the Tv priority mode and the Av priority mode. Display control is performed differently between the Tv priority mode and the Av priority mode.

First, a description will be given of display of the image display section 106 in a case where the exposure mode read in the step S102 in FIG. 2A is the Tv priority mode with reference to FIG. 12.

Figure 12:
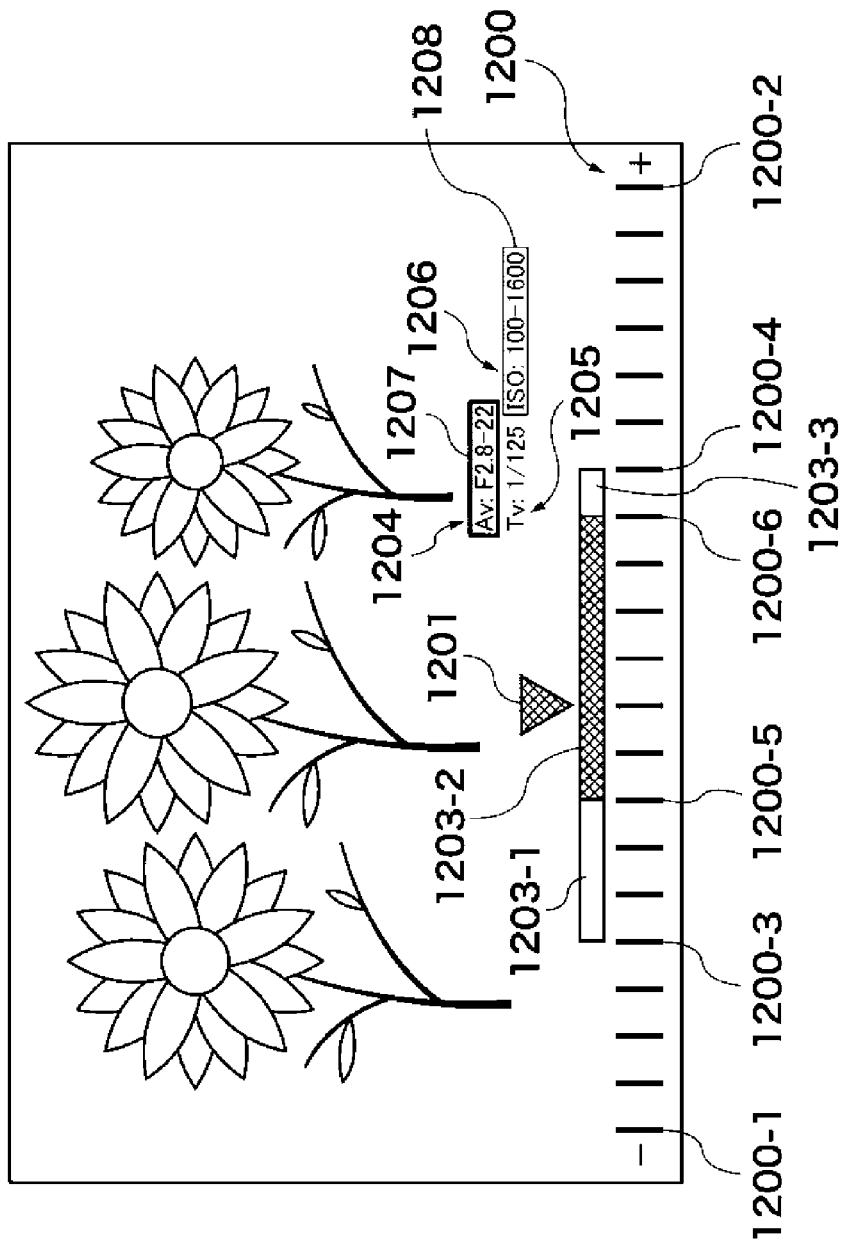
FIG. 12 is a view of a display state of the image display section in the Tv priority mode of a digital camera according to a second embodiment of the present invention.

Reference numerals in FIG. 12 correspond to those in FIG. 7, and settings in FIG. 12 are the same as those in FIG. 7.

In FIG. 12, reference numeral 1203-1 corresponds to reference numeral 303-1 in FIG. 3 and denotes a range where the Bv value varies in a manner interlocked with the ISO sensitivity as it is varied within a range of ISO 1600 to ISO 200, with the Tv value set to 1/125 and the Av value set to F2.8.

Reference numeral 1203-2 corresponds to reference numeral 303-2 in FIG. 3 and denotes a range where the Bv value varies in a manner interlocked with the Av value as it is varied within a range of F2.8 to F22, with the Tv value set to 1/125 and the ISO sensitivity set to ISO 200. Reference numeral 1203-3 corresponds to reference numeral 303-3 in FIG. 3 and denotes a range where the Bv value varies in a manner interlocked with the ISO sensitivity as it is varied within a range of ISO 200 to ISO 100, with the Tv value set to 1/125 and the Av value set to F22.

Reference numeral 1201 denotes the indicator for designating a Bv value for correct exposure recalculated in the step S113 in FIG. 2B. That is, the indicator 1201 indicates a Bv value of 6, and hence the interlocking range (1203-1, 1203-2, and 1203-3 in FIG. 12) permitting shooting with correct exposure without changing the Tv value set to 1/125 is from a position of underexposure lower than the position indicated by the indicator 1201 by five steps to a position of overexposure higher than the same by five steps. From this, the user can know that it is possible to obtain correct exposure without changing the Tv value set to 1/125 even if the brightness of ambient light changes more or less. Further, if the Bv value is within the range 1203-2, the user can know that it is possible to obtain correct exposure with the ISO sensitivity fixed to the preferred ISO sensitivity (ISO 200) read in the step S107 in FIG. 2A and without changing the Tv value set to 1/125.

In FIG. 12, in a case where a plurality of items, such as the Av value and the ISO sensitivity, are changed, priorities are assigned to the respective items, and the Av value is given a higher priority than the ISO sensitivity. More specifically, when the brightness of ambient light changes, the Av value is changed first, and then, if the change in the Av value cannot cope with the change in the brightness of the ambient light, the ISO sensitivity is changed.

A display 1207 as a background of an interlocking range 1204 of Av values and the interlocking range 1203-2 are associated with each other by displaying them in the same display color or pattern. Further, a display 1208 as a background of an interlocking range 1206 of ISO sensitivities and the interlocking ranges 1203-1 and 1203-3 are associated with each other by displaying them in the same display color or pattern. Furthermore, the interlocking range 1203-2 associated with the interlocking range 1204 of Av values and the interlocking ranges 1203-1 and 1203-3 associated with the interlocking range 1206 of ISO sensitivities are displayed such that the interlocking range 1203-2 can be distinguished from the interlocking ranges 1203-1 and 1203-3.

Next, a description will be given of display of the image display section 106 in a case where the exposure mode read in the step S102 in FIG. 2A is the Av priority mode, with reference to FIG. 13.

Figure 13:
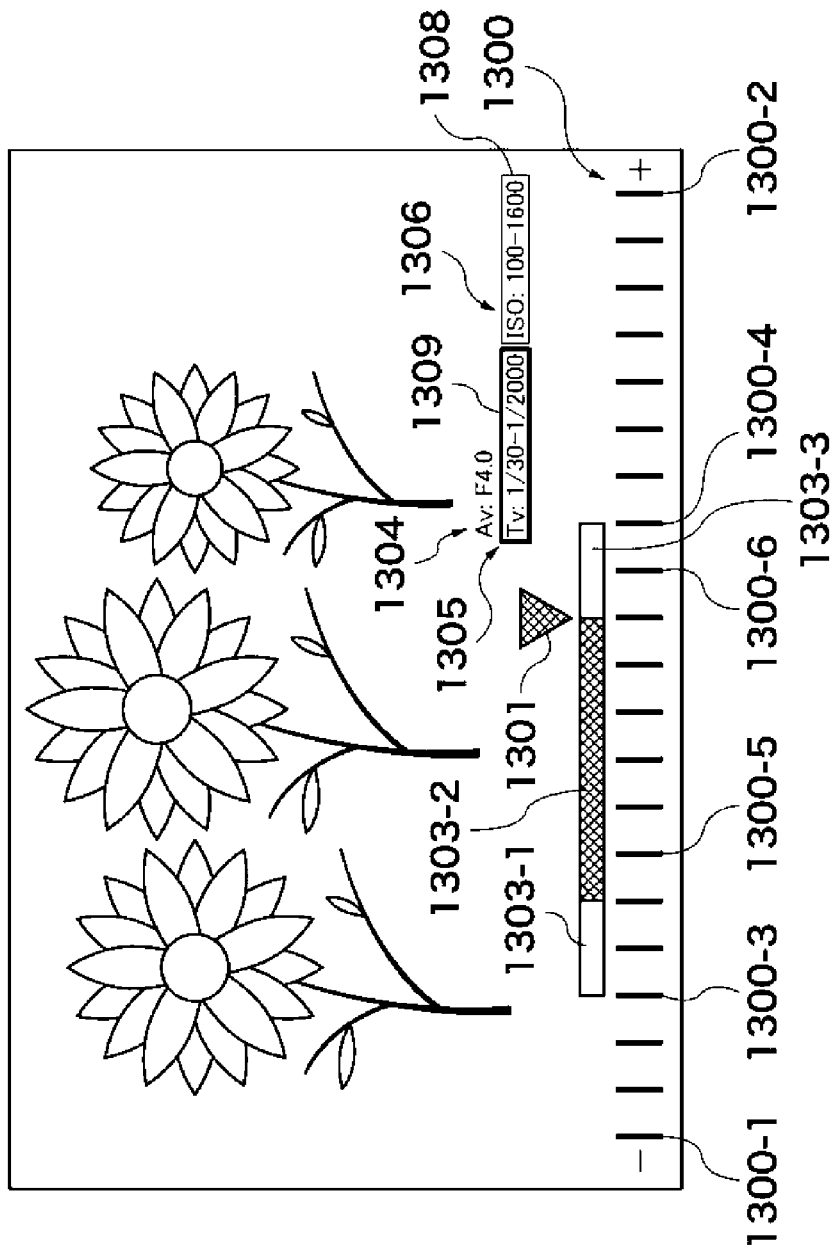
FIG. 13 is a view of a display state of the image display section in the Av priority mode of the digital camera.

Reference numerals in FIG. 13 correspond to those in FIG. 9, and settings in FIG. 13 are the same as those in FIG. 9.

In FIG. 13, reference numeral 1303-1 corresponds to reference numeral 403-1 in FIG. 4 and denotes a range where the Bv value varies in a manner interlocked with the ISO sensitivity as it is varied within a range of ISO 1600 to ISO 400, with the Tv value set to 1/30 and the Av value set to F4.

Reference numeral 1303-2 corresponds to reference numeral 403-2 in FIG. 4 and denotes a range the Bv value varies in a manner interlocked with the Tv value as it is varied within a range of 1/30 to 1/2000, with the Av value set to F4 and the ISO sensitivity set to ISO 400. Reference numeral 1303-3 corresponds to reference numeral 403-3 in FIG. 4 and denotes a range where the Bv value varies in a manner interlocked with the ISO sensitivity as it is varied within a range of ISO 400 to ISO 100, with the Tv value set to 1/2000 and the Av value set to F4.

Reference numeral 1301 denotes the indicator for indicating a Bv value for correct exposure recalculated in the step S113 in FIG. 2B. In FIG. 13, the indicator 1301 designates a Bv value of 8, so that the user can know that the interlocking range permitting shooting with correct exposure without changing the Av value set to F4 is from a position of underexposure lower than the position indicated by the indicator 1301 by eight steps to a position of overexposure higher than the same by two steps. Further, if the indicator 1301 points to a position within the range 1303-2, the user can know that it is possible to obtain correct exposure with the ISO sensitivity fixed to the preferred ISO sensitivity (ISO 400) read in the step S107 in FIG. 2A and without changing the Av value set to F4.

However, the indicator 1301 points to a boundary (corresponding to a Bv value of 8) between the interlocking ranges 1303-2 and 1303-3, so that the user can know that in order to perform shooting with the ISO sensitivity fixed, it is required to set the preferred ISO sensitivity to a lower side with respect to ISO 400, or to make the Av value smaller. A display 1309 as a background of an interlocking range 1305 and an interlocking range 1303-2 are associated with each other by displaying them in the same display color or pattern. Further, a display 1308 as a background of an interlocking range 1306 and the interlocking ranges 1303-1 and 1303-3 are displayed in the same display color or pattern, whereby the ISO sensitivity interlocking range 1306 and the interlocking ranges 1303-1 and 1303-3 are associated with each other.

As described above, according to the present embodiment, the user can know shooting conditions for obtaining correct exposure in a manner associated with corresponding interlocking ranges of Tv values, Av values, and ISO sensitivities from the display on the image display section 106. In addition, when in the Tv priority mode, it is possible to know the interlocking range of Av values in a state where the Tv value and the ISO sensitivity are fixed, while when in the Av priority mode, it is possible to know the interlocking range of Tv values in a state where the Av value and the ISO sensitivity are fixed. This enables the user to foresee more finely whether shooting is possible within an interlocking range for correct exposure, even if ambient light changes.

A third embodiment of the present embodiment is distinguished from the first embodiment only by the display operation of the image display section 106 in the step S120 in FIG. 2B. In the following, different points from the first embodiment will be described with reference to FIGS. 14 to 17.

First, a description will be given of different points of a program diagram for the Tv priority mode shown in FIG. 14 from the program diagram shown in FIG. 3.

Figure 14:
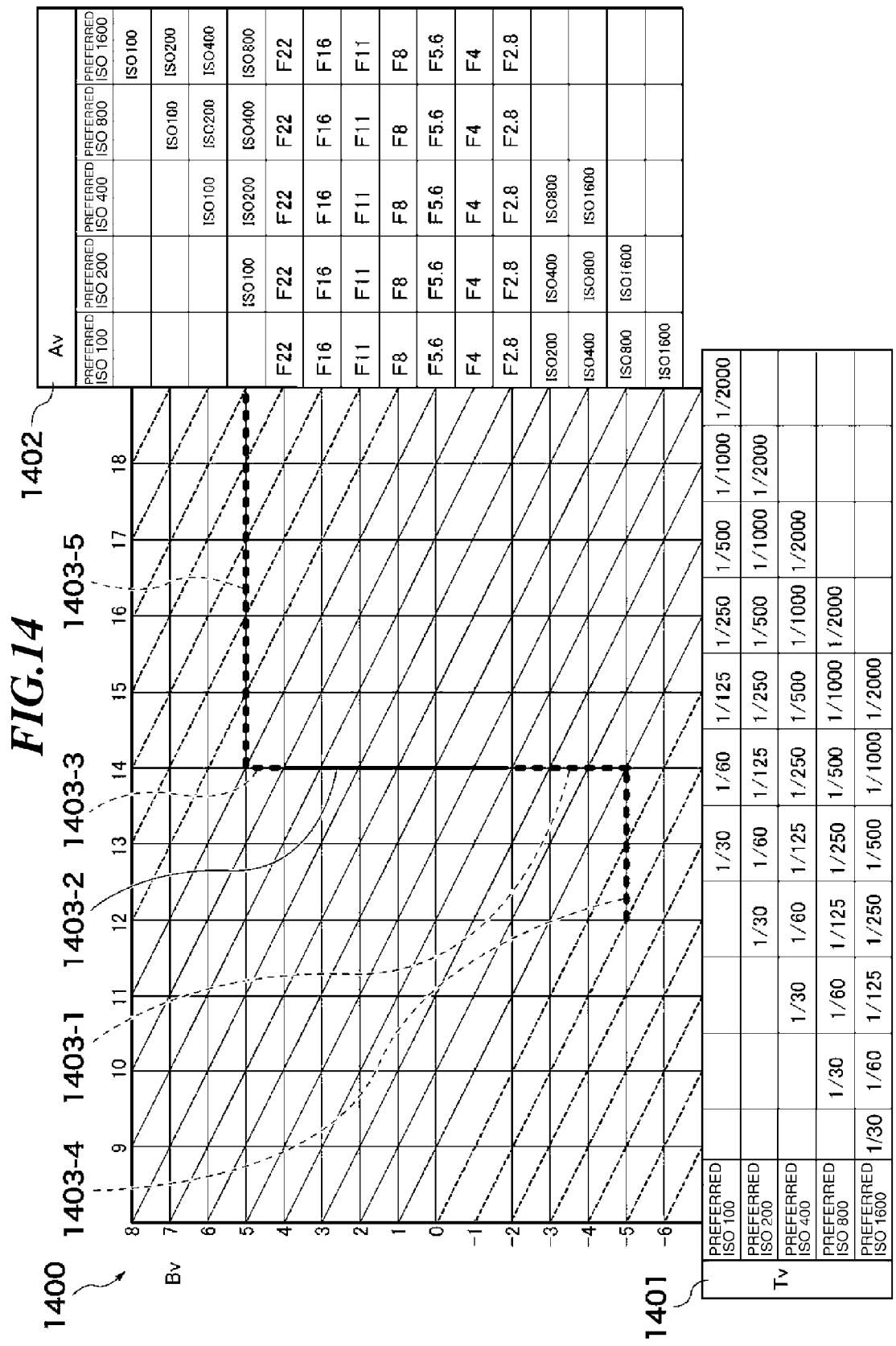
FIG. 14 is a program diagram in the Tv priority mode of a digital camera according to a third embodiment of the present invention.

In FIG. 14, reference numerals correspond to those in FIG. 3, respectively. FIG. 14 is different from FIG. 3 in that segments denoted by reference numerals 1403-4 and 1403-5 are added. The dotted line segments 1403-4 and 1403-5 correspond to respective regions where when the correct exposure cannot be reached even after the Av value and the ISO sensitivity are changed to the limits of the respective associated interlocking ranges, the Tv value is shifted to a lower-speed side or a higher-speed side than the setting read in the step S104 in FIG. 2A so as to maintain the correct exposure.

For example, in a case where the Tv value is set to 1/125 and the ISO sensitivity is set to ISO 200 preferred in auto ISO, and the interlocking range of Av values determined in the step S101 in FIG. 2A is F2.8 to 22, a range where the Bv value varies in an interlocked manner while the Tv value is fixed to 1/125 corresponds to a dotted line segment 1403-1, a solid line segment 1403-2, and a dotted line segment 1403-3. Further, a range where the Bv value varies in an interlocked manner as the Tv value is shifted from 1/125 corresponds to the dotted line segments 1403-4 and 1403-5.

Next, a description will be given of different points of a program diagram for the Av priority mode in FIG. 15 from the program diagram in FIG. 4.

Figure 15:
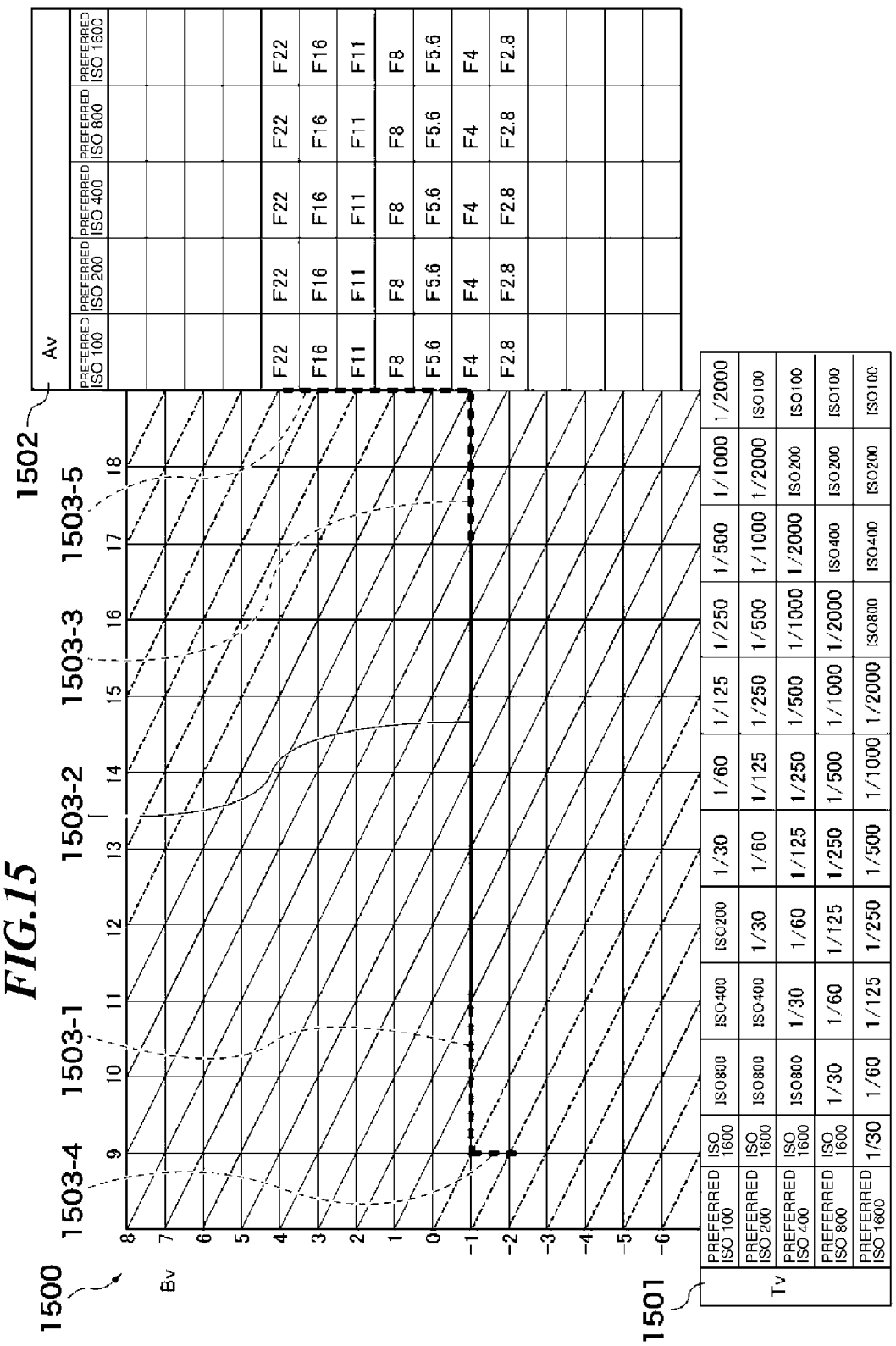
FIG. 15 is a program diagram in the Av priority mode of the digital camera.

In FIG. 15, reference numerals correspond to those in FIG. 4, respectively. FIG. 15 is different from FIG. 4 in that segments denoted by reference numerals 1503-4 and 1503-5 are added. The dotted line segments 1503-4 and 1503-5 correspond to respective regions where when the correct exposure cannot be reached even after the Tv value and the ISO sensitivity are changed to the limits of the respective associated interlocking ranges, the Av value is shifted toward an open side or a small aperture side from the setting read in the step S106 in FIG. 2A so as to maintain the correct exposure.

For example, in a case where an Av value of F4 (the interlocking range of Av values of the lens is from F2.8 to 22), auto ISO, and ISO 200 preferred are set, a range where the Bv value varies in an interlocked manner while the Av value is fixed to F4 corresponds to a dotted line segment 1503-1, a solid line segment 1503-2, and a dotted line segment 1503-3. Further, a range where the Bv value varies in an interlocked manner as the Av value is shifted from F4 corresponds to the dotted line segments 1503-4 and 1503-5.

Next, a description will be given of different points from the first embodiment in the display operation performed by the image display section 106 in the Tv priority mode or the Av priority mode in the step S120 in FIG. 2B.

A description will be given of display of the image display section 106 in a case where the exposure mode read in the step S102 in FIG. 2A is the Tv priority mode, with reference to FIG. 16.

Figure 16:
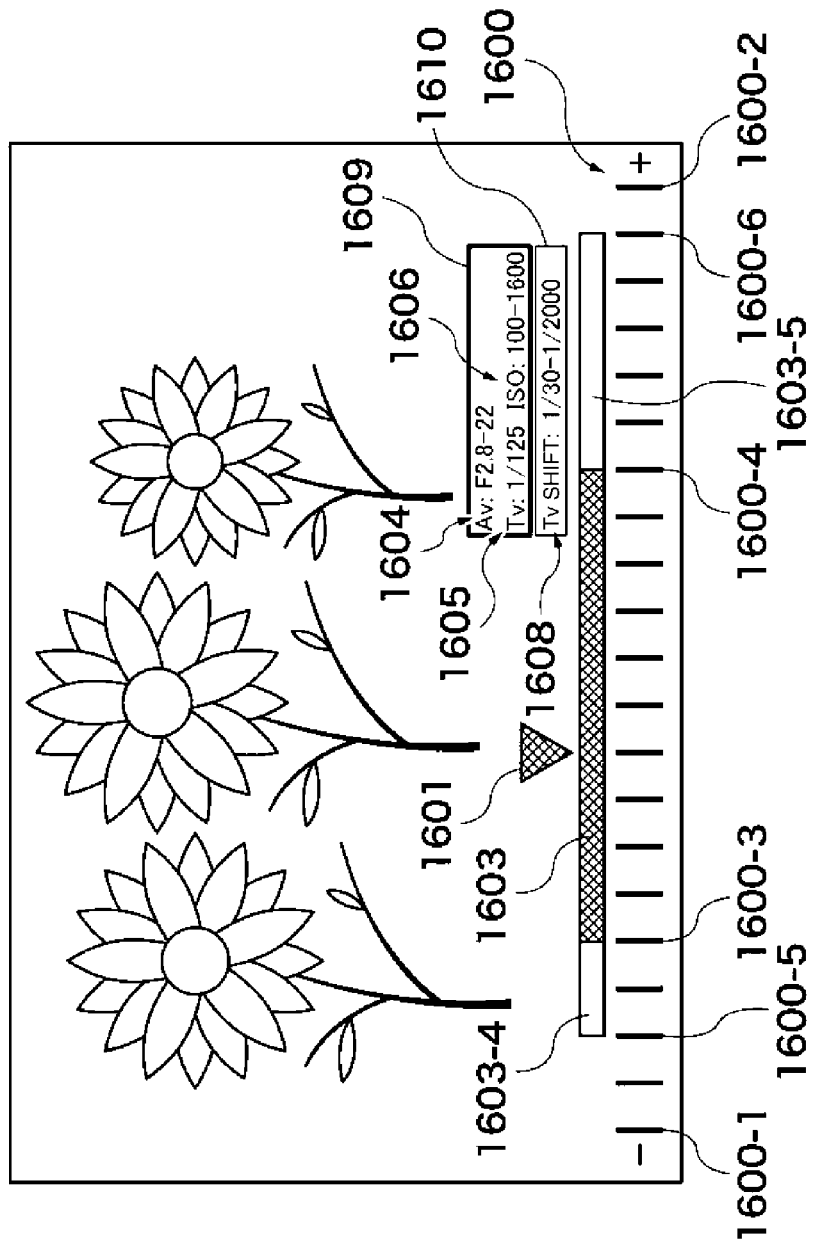
FIG. 16 is a view of a display state of the image display section in the Tv priority mode of the digital camera.

Reference numerals in FIG. 16 correspond to those in FIG. 7, and settings in FIG. 16 are the same as those in FIG. 7.

In FIG. 16, reference numeral 1603 denotes an interlocking range where the Bv value varies in an interlocked manner according to the line segments 1403-1, 1403-2, and 1403-3 in FIG. 14. More specifically, the interlocking range is defined by the FIG. 14 program diagram such that it ranges from a Bv value of 1 to a Bv value of 11, and therefore the interlocking range 1603 displayed also extends from a marking 1600-3 on a scale 1600 corresponding to a Bv value of 1 to a marking 1600-4 on the same corresponding to a Bv value of 11.

The interlocking range 1603-4 corresponds to the range in FIG. 14 where the Bv value varies in an interlocked manner while the Tv value is shifted toward the low-speed side, and the interlocking range 1603-5 corresponds to the range in FIG. 14 where the Bv value varies in an interlocked manner while the Tv value is shifted toward the high-speed side. Reference numeral 1601 denotes an indicator for designating a Bv value for correct exposure recalculated in the step S113 in FIG. 2B. In FIG. 16, if the indicator 1601 points to a position within the interlocking range 1603, the user can know that it is possible to obtain correct exposure without changing the set Tv value. If the indicator 1601 points to a position within the interlocking range 1603-4 or 1603-5, the user can know that although the Tv value is required to be shifted from the setting, it is possible to obtain correct exposure.

A display 1609 as a background of interlocking ranges 1604 and 1606 and settings 1605, and the interlocking range 1603 are displayed in the same display color or pattern, whereby values in the interlocking ranges 1604 and 1606 and the settings 1605 and the interlocking range 1603 are shown in a manner associated with each other.

Reference numeral 1610 denotes a range within which the Tv value can be shifted. A display 1608 as a background of the shift range 1610, and the interlocking ranges 1603-4 and 1603-5 are displayed in the same display color or pattern, whereby the range 1610 within which the Tv value can be shifted and the interlocking ranges 1603-4 and 1603-5 are shown in a manner associated with each other.

Next, a description will be given of display of the image display section 106 in a case where the exposure mode read in the step S102 in FIG. 2A is the Av priority mode, with reference to FIG. 17.

Figure 17:
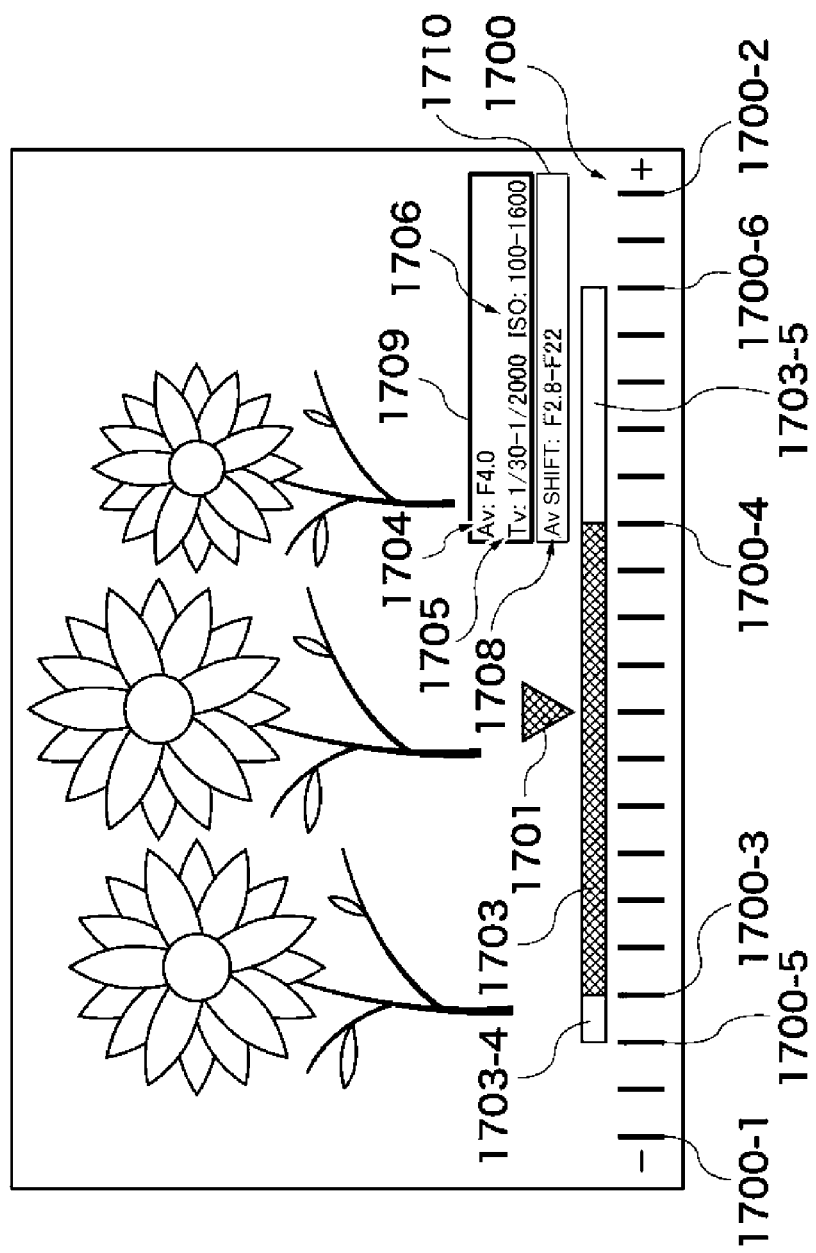
FIG. 17 is a view of a display state of the image display section in the Av priority mode of the digital camera.

Reference numerals in FIG. 17 correspond to those in FIG. 7, and settings in FIG. 17 are the same as those in FIG. 7. In FIG. 17, reference numeral 1703 denotes an interlocking range of Bv values which vary according to the line segments 1503-1, 1503-2, and 1503-3 of the program diagram for correct exposure in FIG. 15. More specifically, an interlocking range of Bv values from a Bv value of 0 to a Bv value of 10 is obtained from the FIG. 14 program diagram, and therefore an interlocking range 1703 is displayed as a range extending from a position indicated by a marking 1700-3 on a scale 1700 corresponding to the Bv value of 0 to a position indicated by a marking 1700-4 on the same corresponding to the Bv value of 10.

An interlocking range 1703-4 corresponds to a range in FIG. 15 where the Bv value varies in an interlocked manner as the Av value is shifted toward the open side. the Tv value is shifted toward the high-speed side. An interlocking range 1703-5 corresponds to a range in FIG. 15 where the Bv value varies in an interlocked manner as the Av value is shifted toward the smaller aperture side. Reference numeral 1701 denotes an indicator for designating a Bv value for correct exposure recalculated in the step S113 in FIG. 2B. If the indicator 1701 points to a position within the interlocking range 1703, the user can know that it is possible to obtain correct exposure without changing the set Av value. If the indicator 1701 points to a position within the interlocking range 1703-4 or 1703-5, the user can know that although the Av value is required to be shifted from the setting, it is possible to obtain correct exposure.

A display 1709 as a background of interlocking ranges 1705 and 1706 and settings 1704, and the interlocking range 1703 are displayed in the same display color or pattern, whereby values in the settings 1704 and the interlocking ranges 1705 and 1706 and the interlocking range 1703 are shown in a manner associated with each other.

Reference numeral 1710 denotes a range within which the Av value can be shifted. A display 1708 as a background of the range 1710 and the interlocking ranges 1703-4 and 1703-5 are displayed in the same display color or pattern, whereby the Av shift range 1710 and the interlocking ranges 1703-4 and 1703-5 are shown in a manner associated with each other.

As described above, according to the present embodiment, the user can recognize shooting conditions for obtaining correct exposure and a range where the correct exposure can be obtained without changing a set Tv value or a set Av value, in association with each other, for shooting in the Tv priority mode or in the Av priority mode. In addition, This enables the user to know a range where the correct exposure level can be varied in a manner interlocked with the Tv value or the Av value as it is shifted from a setting thereof.

Although in the first to third embodiments, information on shooting is displayed on the image display section 106 of the digital camera, this is not limitative, but with respect to a brightness value Bv metered by the light metering section 154 before moving image shooting or still image shooting performed with the main mirror 150 in the viewing position 150A, a Bv value for correct exposure and interlocking ranges of Tv values, Av values, and ISO sensitivities in each of the exposure modes may be displayed on a display section within the viewfinder 160. This enables a user to monitor information on shooting via the viewfinder 160.

Further, although an image representing a position of the current object brightness and an image representing an object brightness that can be set as a target exposure by exposure control are displayed in a manner associated with each other by the same scale, this is not limitative, but they may be displayed using different scales.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-210492, filed Sep. 11, 2009, which is hereby incorporated by reference herein in its entirety.

What is claimed is:

1. An image pickup apparatus comprising:
    a display unit;
    a light metering unit configured to meter an object light;
    a calculating unit configured to calculate a first object brightness based on the metered object light;
    an exposure control unit configured to set at least one exposure control value based on the first object brightness to perform exposure control such that an exposure becomes equal to a target exposure determined based on the first object brightness; and
    a display control unit configured to cause said display unit to display an image relating to the first object brightness, a second object brightness that enables the exposure to be set to the target exposure by changing the at least one exposure control value currently set by said exposure control unit, and a third object brightness that disables the exposure to be set to the target exposure by changing the at least one exposure control value currently set by said exposure control unit,
    wherein said display control unit causes said display unit to display the image such that the image enables the second object brightness and the third object brightness to be distinguished from each other.

2. The image pickup apparatus according to claim 1, wherein said display control unit causes said display unit to display the image in a manner associating the first object brightness, the second object brightness, and the third object brightness with one another.

3. The image pickup apparatus according to claim 1, wherein when the first object brightness changes, said exposure control unit performs the exposure control by changing at least one of an aperture value, a charge accumulation time, and a photographic sensitivity.

4. The image pickup apparatus according to claim 1, wherein in a case where when the first object brightness changes, the exposure control is performed by changing more than one item of the aperture value, the charge accumulation time, and the photographic sensitivity in a predetermined order of priority, said display control unit causes said display unit to display the image such that the image enables an object brightness that enables the exposure to be set to the target exposure by changing a high-priority item and an object brightness that enables the exposure to be set to the target exposure by changing a low-priority item to be distinguished from each other.

5. A method of controlling an image pickup apparatus including a display unit, a light metering unit configured to meter an object light, a calculating unit configured to calculate a first object brightness based on the metered object light, and an exposure control unit configured to set at least one exposure control value based on the first object brightness to perform exposure control such that an exposure becomes equal to a target exposure determined based on the first object brightness, comprising:
    causing the display unit to display an image relating to the first object brightness, a second object brightness that enables the exposure to be set to the target exposure by changing the at least one exposure control value currently set by said exposure control unit, and a third object brightness that disables the exposure to be set to the target exposure by changing the at least one exposure control value currently set by said exposure control unit; and
    causing the display unit to display the image such that the image enables the second object brightness and the third object brightness to be distinguished from each other.

* * * * *